US006366425B1

(12) United States Patent
Kletzl et al.

(10) Patent No.: US 6,366,425 B1
(45) Date of Patent: Apr. 2, 2002

(54) STORAGE SYSTEM INCLUDING A STORAGE DEVICE AND A STORAGE CONTAINER AND POSITIONING MEANS FOR POSITIONING THE STORAGE CONTAINER IN THE STORAGE DEVICE

(75) Inventors: Franz Kletzl, Mank; Henricus Ruyten, Gumpoldskirchen, both of (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/437,483

(22) Filed: Nov. 10, 1999

(30) Foreign Application Priority Data

Nov. 12, 1998 (EP) .............................. 98890340

(51) Int. Cl.⁷ ............................................ G11B 15/675
(52) U.S. Cl. ....................................... 360/96.5; 360/95
(58) Field of Search ............................ 360/96.5, 99.02, 360/99.03, 99.06, 99.07, 93, 95

(56) References Cited

U.S. PATENT DOCUMENTS 6,064,545 A * 5/2000 Kletzl ......................... 360/95

* cited by examiner

Primary Examiner—Robert S. Tupper
(74) Attorney, Agent, or Firm—Aaron Waxler

(57) ABSTRACT

In a storage device (1) and in a storage container (3) which can be loaded into the storage device (1), the storage device (1) has holder means (46) for holding a storage container (3) which are guided so as to be movable between an loading position and an operating position and which are movable out their loading position in a first direction of movement (74) and which are movable into their operating position in a second direction of movement (75) which is oriented transversely to the first direction of movement (74), and the storage container (3) has container-mounted positioning means (15) and the storage device (1) has device-mounted positioning means (156), the cassette-mounted positioning means (15) and the device-mounted positioning means (156) are constructed and arranged in such a manner that during a movement of the holder means (46) from their loading position into their operating position the storage container (3) can be positioned with respect to the device-mounted storage processing means already at the end of the movement in the first direction of movement (74) and during the subsequent movement in the second direction of movement (75) with the aid of the cooperating positioning means (15, 156).

30 Claims, 13 Drawing Sheets

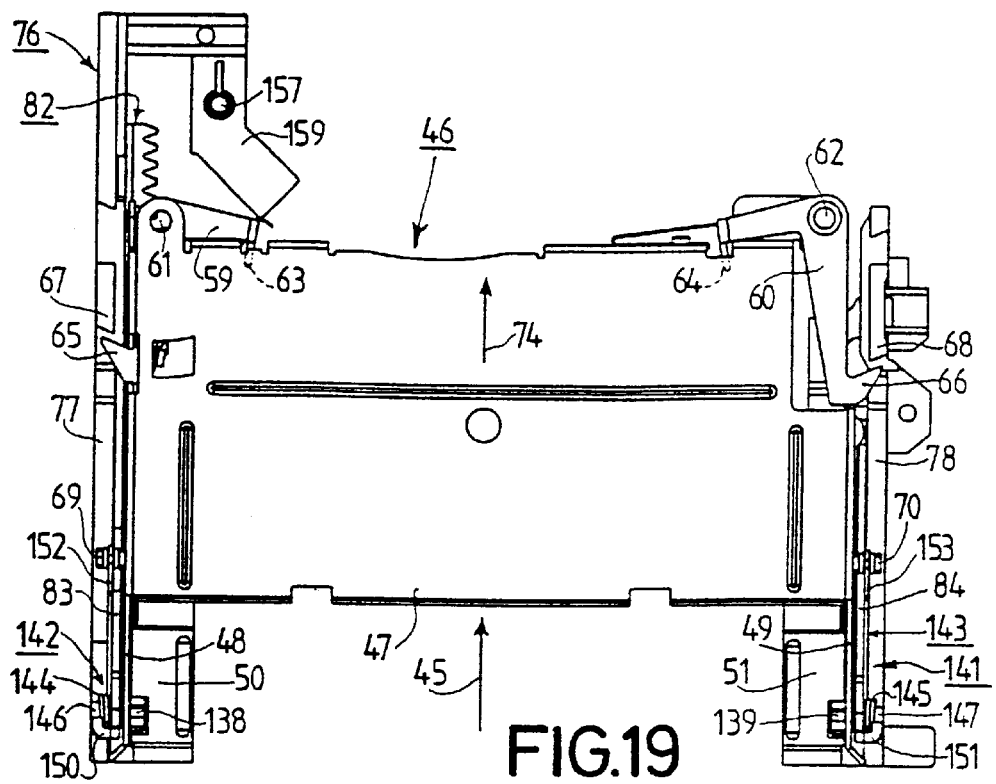
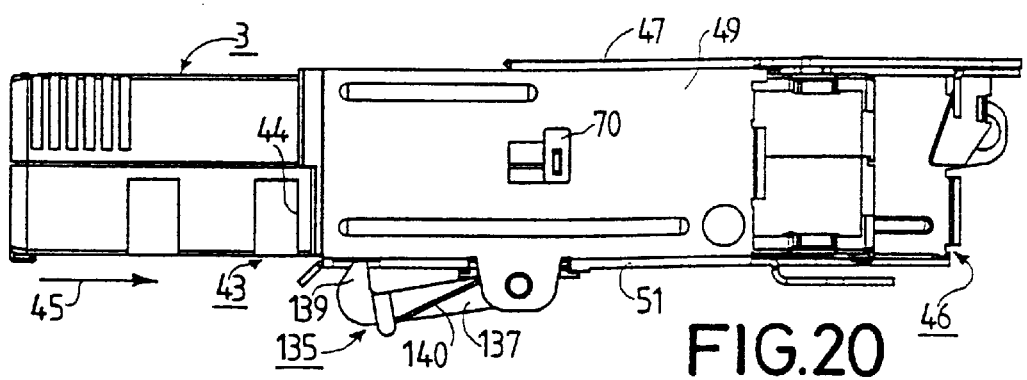
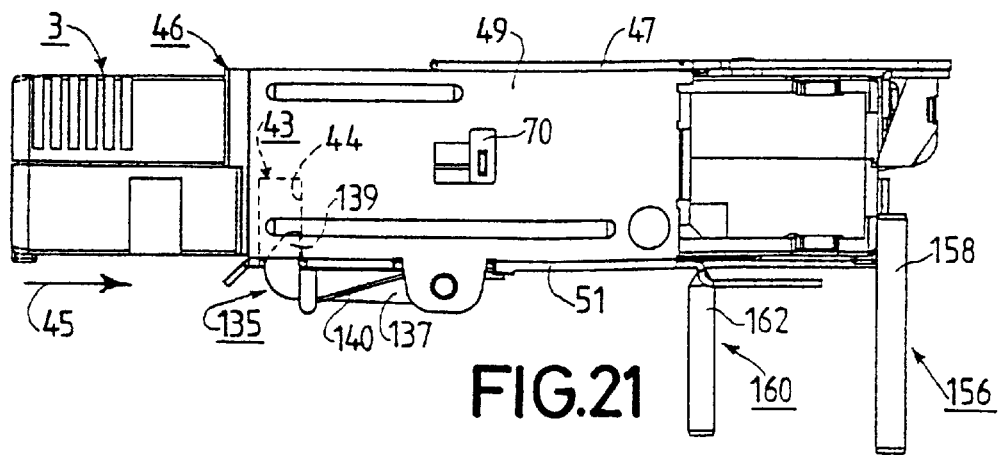

STORAGE SYSTEM INCLUDING A STORAGE DEVICE AND A STORAGE CONTAINER AND POSITIONING MEANS FOR POSITIONING THE STORAGE CONTAINER IN THE STORAGE DEVICE

BACKGROUND OF THE INVENTION

1. Field of the Invention

The invention relates to a storage system comprising a storage device and a storage container which can be loaded into the storage device, and in which the storage container has a bottom surface and contains at least one storage medium and has access means in the area of at least one container surface, the access means enabling the storage medium to be accessed, and in which the storage device comprises movable holder means constructed to hold a storage container, and comprises guide means constructed to guide the holder means so that the holder means can be guided between a loading position, in which the storage container can be loaded into the holder means, and an operating position, in which the storage container occupies an operating position, said guiding being effected along an inclined guide path in such a manner that the holder means is movable out of the loading position in a first direction of movement, and into the operating position in a second direction of movement which extends transversely to the first direction of movement, and comprises storage processing means which serves to process the storage medium contained in the storage container and which is in operative engagement with the storage medium via the access means of the storage container after the movement of the holder means in the second direction of movement into the operating position.

The invention further relates to a storage device into which a storage container can be loaded, the storage container having a bottom surface and contains at least one storage medium and has access means in the area of at least one container surface, the access means enabling the storage medium to be accessed, the storage device comprising movable holder means constructed to hold a storage container, and which comprises guide means which are constructed to guide the holder means so that the holder means can be guided between a loading position, in which the storage container, can be loaded into the holder means, and an operating position, in which the storage container occupies an operating position, said guiding being effected along an inclined guide path in such a manner that the holder means is movable out of the loading position in a first direction of movement, and into the operating position in a second direction of movement which extends transversely to the first direction of movement, and storage processing means which serves to process the storage medium contained in the storage container and which is in operative engagement with the storage medium via the access means of the storage container after the movement of the holder means in the second direction of movement into the operating position.

The invention further relates to a storage container having a bottom surface and containing at least one storage medium and having access means in the area of at least one container surface, the access means enabling the storage medium to be accessed, the storage containers being loadable into a storage device, which comprises movable holder means constructed to hold a storage container, and guide means constructed to guide the holder means so that the holder means can be guided between a loading position, in which the storage container can be loaded into the holder means, and an operating position, in which the storage container occupies an operating position, said guiding being effected along an inclined guide path in such a manner that the holder means is movable out of the loading position in a first direction of movement, and into the operating position in a second direction of movement which extends transversely to the first direction of movement, and storage processing means which serves to process the storage medium contained in the storage container and which is in operative engagement with the storage medium via the access means of the storage container after the movement of the holder means in the second direction of movement into the operating position.

2. Description of the Related Art

Such a storage system of the type defined in the first paragraph and such a storage device of the type defined in the second paragraph, as well as such storage container of the type defined in the third paragraph, are known, for example, from the International Patent Application WO 98/44499 A1, and corresponding U.S. patent application Ser. No. 09/054,109, filed Apr. 2, 1998. In the solution known from said patent document, the storage container is formed by a cassette, namely, a magnetic-tape cassette in which the storage medium is a magnetic tape wound onto a rotationally drivable supply reel accommodated in the cassette. According to the known solution, the storage processing means is formed by a reel drive device, which, in a manner known per se, comprises a rotationally drivable reel disc having tooth-like drive means which can be brought into operative engagement, i.e., in driving engagement, with tooth-like counter means and which is in driving engagement when the cassette is in its operating position. According to the known solution, the supply reel in the cassette and the device-mounted reel drive device enter into operative engagement, i.e., into driving engagement, when the holder means, which contain the cassette, is moved in the second direction of movement, but the correct mutual positioning of the supply reel and the reel drive device depends strongly on the instantaneous position of the cassette in the holder means and, consequently, on the instantaneous relative position of the supply reel of the cassette with respect to the reel drive device. This may lead to an inexact mutual positioning of the supply reel and the reel drive device, and to a delayed engagement of the supply reel and the reel drive device, but this is undesirable and, in the worst case, may lead to problems when driving of the supply reel begins.

SUMMARY OF THE INVENTION

It is an object of the invention to preclude the aforementioned problems and to provide an improved storage system of the type defined in the first paragraph, and an improved storage device of the type defined in the second paragraph, as well as an improved storage container of the type defined in the third paragraph, using simple means, in which care has been taken that the operative engagement between the device-mounted storage processing means and the storage medium in the container always proceeds in an exact and trouble-free manner.

According to the invention, in order to achieve this object, a storage system of the type defined in the first paragraph, is characterized in that the storage container includes container-mounted positioning means, and the storage device includes device-mounted positioning means, and the container-mounted positioning means and the device-mounted positioning means are constructed to cooperate with each other and to position the storage container with respect to the storage processing means in directions which extend parallel to the bottom surface of the storage container, and the container-mounted positioning means and the device-mounted positioning means are constructed and arranged in such a manner that during the movement of the holder means from the loading position into the operating position, the storage container can be positioned already at the end of the movement in the first direction of movement and during the subsequent movement in the second direction of movement with the aid of the positioning means which cooperate with each other, before the holder means has reached the operating position and before the storage processing means enters into operative engagement with the storage medium in the storage container.

According to the invention, in order to achieve the aforementioned object, a storage device of the type defined in the second paragraph is characterized in that the storage container includes container-mounted positioning means, and the storage device includes device-mounted positioning means and the container-mounted positioning means and the device-mounted positioning means are constructed to cooperate with each other and to position the storage container with respect to the storage processing means in directions which extend parallel to the bottom surface of the storage container, and the container-mounted positioning means and the device-mounted positioning means are constructed and arranged in such a manner that during the movement of the holder means from the loading position into the operating position, the storage container can be positioned already at the end of the movement in the first direction of movement and during the subsequent movement in the second direction of movement with the aid of the positioning means which cooperate with each other, before the holder means has reached the operating position and before the storage processing means enters into operative engagement with the storage medium in the storage container.

According to the invention, in order to achieve the aforementioned object, a storage container of the type defined in the third paragraph is characterized in that the storage container includes container-mounted positioning means and the container-mounted positioning means is constructed to position the storage container with respect to the device-mounted storage processing means in directions which extend parallel to the bottom surface of the storage container, and the container-mounted positioning means is constructed and arranged in such a manner that during a movement of the holder means, which contain the storage container, from the loading position into the operating position, the storage container can be positioned already at the end of the movement in the first direction of movement and during the subsequent movement in the second direction of movement with the aid of the cassette-mounted positioning means which cooperates with the device-mounted positioning means before the device-mounted storage processing means enters into operative engagement with the storage medium in the storage container.

By taking the measures in accordance with the invention, it is achieved, by particularly simple means, that a storage container, present in the holder means of a storage device in accordance with the invention is positioned exactly and accurately already at the end of the movement of the holder means in the first direction of movement and uninterruptedly also during the subsequent movement of the holder means in the second direction of movement with the aid of the container-mounted positioning means and the device-mounted positioning means, as a result of which, the storage container, in accordance with the invention, occupies a well-defined position with respect to the storage processing means of the storage device in accordance with the invention, which ensures that an exact operative engagement between the storage processing means and the storage medium in the storage container is obtained already when the storage container reaches the operating position.

A storage system in accordance with the invention may be formed by, for example, a write/read system for contact-bound chip cards, in which case, the storage device is formed by a write/read station and the storage container is formed by a chip card, while the storage medium is formed by an integrated circuit embedded in the chip card, the device-mounted storage processing means being formed by contact pins which can be brought into operative engagement, i.e., contact engagement; with contact pads of the card, the contact pads forming access means. It has proven to be particularly favorable when a storage system, in accordance with the invention, that includes a recording and/or reproducing device as storage device and a cassette which can e loaded into the recording and/or reproducing device as a storage container. Such a storage system may comprise, for example, a storage container which contains a rotationally drivable hard disk as storage medium, and it may comprise a storage device in the form of a recording and reproducing device for rotationally driving and scanning the hard disk. These measures have proven to be particularly advantageous in a recording and reproducing system in which the record carrier in the cassette is a magnetic tape wound onto at least one reel.

In a storage system in accordance with the invention in which the storage container is a cassette, the cassette-mounted positioning means may be arranged, for example, in the area of the two further side walls, i.e., the left-hand side wall and the right-hand side wall, and may be formed, for example, by a positioning recess which is open towards one of these two side walls. Furthermore, the container-mounted positioning means may be positioning walls which extend in the area of the two further side walls and parallel to the front side wall, the positioning walls being formed in that the two further side walls are stepped. However, it has proven to be particularly advantageous if the container-mounted positioning means is arranged in the area of the front side wall of the cassette. In this respect, it has proven to be particularly advantageous that the cassette-mounted positioning means comprises a first positioning location and a second positioning location which is spaced at a distance from the first positioning location, and the first positioning location has two positioning walls which project from the front side wall towards the cassette interior, the two positioning walls being inclined towards one another and bound a wedge-shaped recess, the recess bounded by the two positioning walls being open towards the bottom wall, and the second positioning location being defined by a positioning portion of the front side wall of the cassette, and that the recess bounded by the two positioning walls ahs a bounding wall extending substantially parallel to the upper wall and to the bottom wall of the cassette, and being situated at a given distance form the upper wall of the cassette.

In a storage system in accordance with the invention having a storage container in the form of a cassette, it has proven to be advantageous if the holder means includes locking means for locking the cassette in the holder means, and the container-mounted positioning means can thus be held in operative engagement with the device-mounted positioning means. The locking means may, for example; be constituted by blade springs which act on the upper wall of a cassette, in which case the cassette is locked by friction. However, it has proven to be advantageous if that locking means is connected to the cassette holder and can engage and thereby lock the cassette, present in the cassette holder, in the area of at least on elocking wall which extends substantailly parallel to the front side wall and is spaced at a distance from the front side wall, that the locking means comprises at least a one locking lever which is pivotably mounted on the cassette holder, and the storage system comprises spring means for urging the locking levers towards a locking position of the locking lever, and that the locking wall is formed by a bounding wall of a locking recess which is open towards the bottom wall of the cassette.

The container-mounted positioning means and the device-mounted positioning means may, at the same time, be used for the final positioning of the cassette in its operating position. However, tests have shown that it is particularly advantageous not to use the container-mounted positioning means and the device-mounted positioning means for the final positioning of the cassette, but to use separate final positioning means.

The above-mentioned as well as further aspects of the invention will become apparent from the embodiments described hereinafter by way of example and will be elucidated with reference to these examples.

BRIEF DESCRIPTION OF THE DRAWING

The invention will pow be described in more detail with reference to the drawings, which show some embodiments given by way of example but to which the invention is not limited. In the drawing:

FIG. 19 is a plan view showing the holder means of FIGS. 17 and 18;

FIG. 20 is a side view showing the holder means of FIGS. 17, 18 and 19 and a cassette inserted partly into the holder means;

FIG. 21, in a manner similar to FIG. 20, shows the holder means and a cassette wholly inserted into the holder means;

DESCRIPTION OF THE PREFERRED EMBODIMENTS

Figure 1:
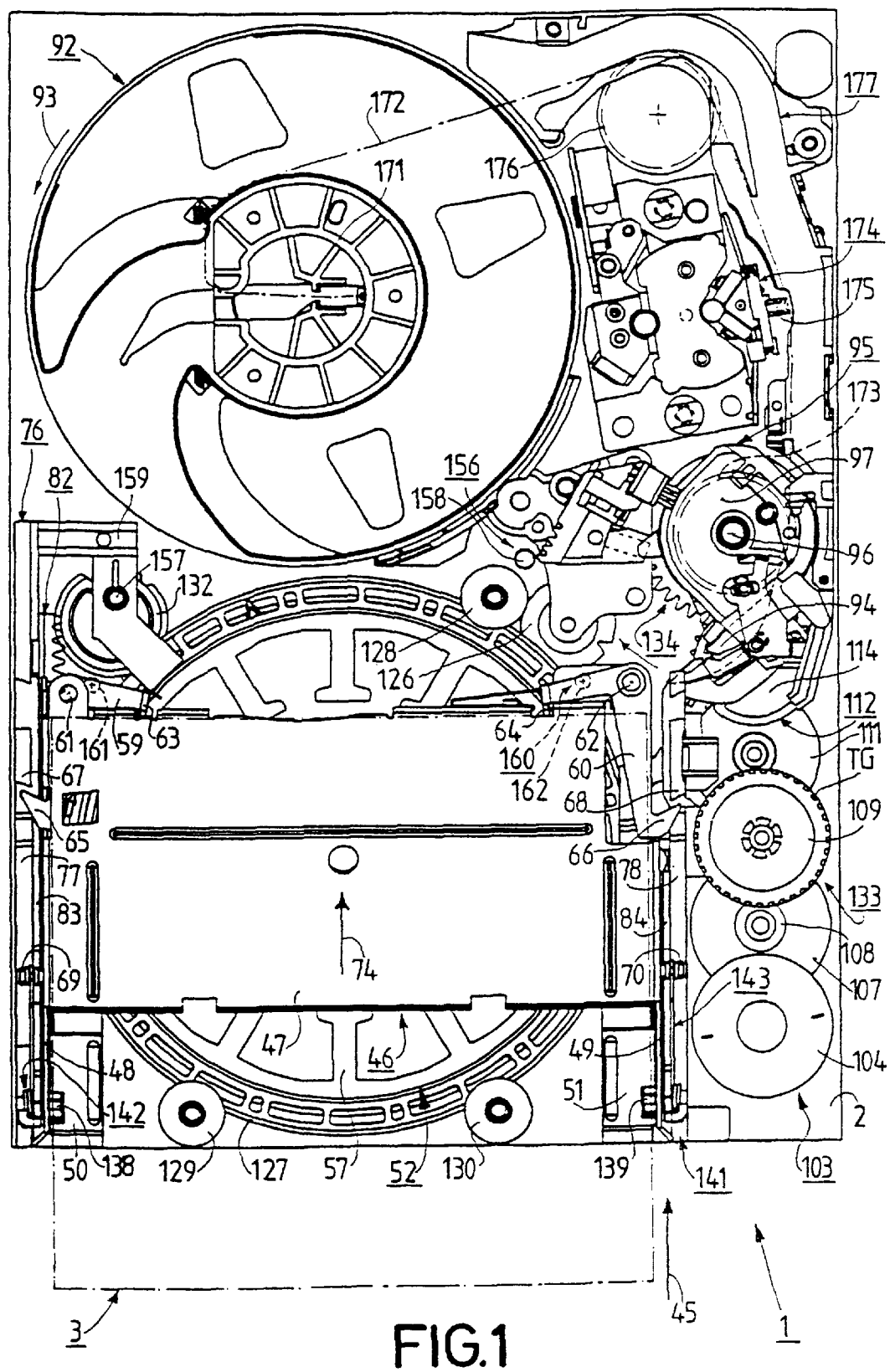
FIG. 1 is a top view of a storage device formed by a recording and reproducing device in accordance with a first embodiment of the invention, into which device a cassette can be loaded as a storage container.

FIG. 1 shows a recording and reproducing device 1 in accordance with an embodiment of the invention which forms a storage device for the storage of digital data on a storage medium, i.e., a magnetic tape, and which can also be regarded as a processing device for the processing of coupling element 27 formed by a coupling pin 27 and connected at the free end position to the magnetic tape 26. The coupling pin 27 has a comparatively thin central portion 28, and an upper first end portion 29 and a lower second end portion 30, both end portions 29 and 30 having a larger diameter than the central portion 28.

In the cassette 3, the coupling pin 27 is held in a coupling position, namely, by means of two positioning forks 31 and 32 which cooperate with the two end portions 29 and 30 of the coupling pin 27. Furthermore, at least one retaining element, not shown in the Figures, may be provided, this retaining element being movable between a retaining position and a release position for actuating a mechanism, this retaining element being held in its release position by the mechanism upon entry of the coupling pin 27 into the cassette 3 and is subsequently moved into its retaining position and engages behind the coupling pin 27. The two end portions 29 and 30 are then held in the positioning forks 31 and 32 by the retaining element, as a result of which, the coupling position of the coupling pin 27 is accurately defined.

The two housing halves 5 and 6 of the housing 4 are secured to one another by three screws 33. The screws 33 fit into hollow cylindrical connecting posts 34 and 35, the hollow cylindrical connecting posts 34 and 35 being visible through the access opening 23 in FIG. 2.

Figure 2:
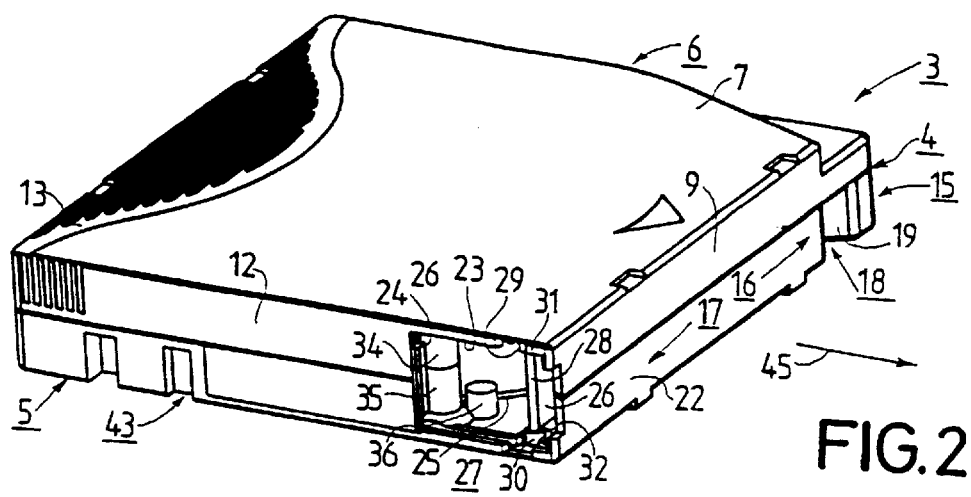
FIG. 2 is an oblique top view of the cassette which can be loaded into the recording and reproducing device of FIG. 1 as a storage container, the cassette accomodating a record carrier in the form of a tape as storage medium, namely, a magnetic tape, a coupling pin being provided at a free end of the magnetic tape.
Figure 4:
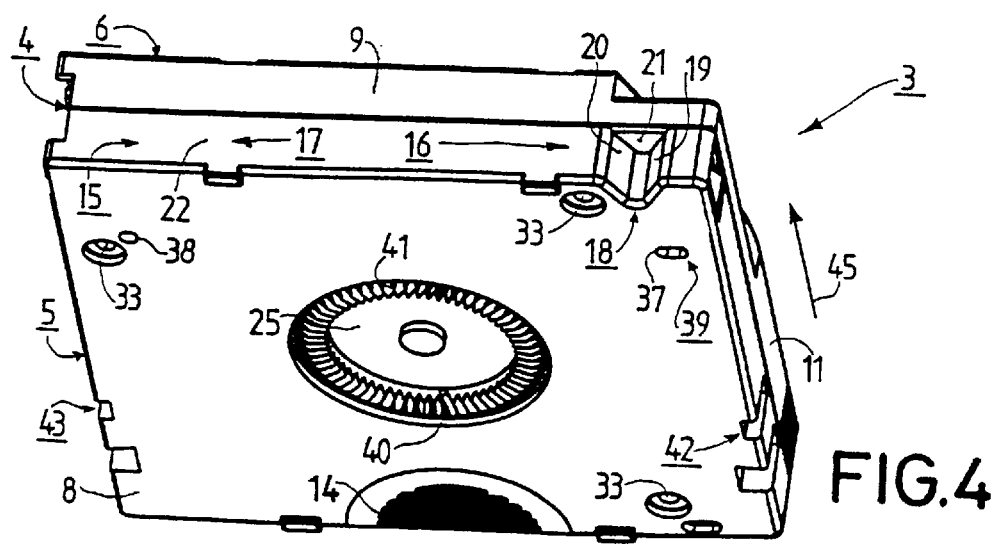
FIG. 4 is an underneath view of the cassette shown in FIGS. 2 and 3.
Figure 5:
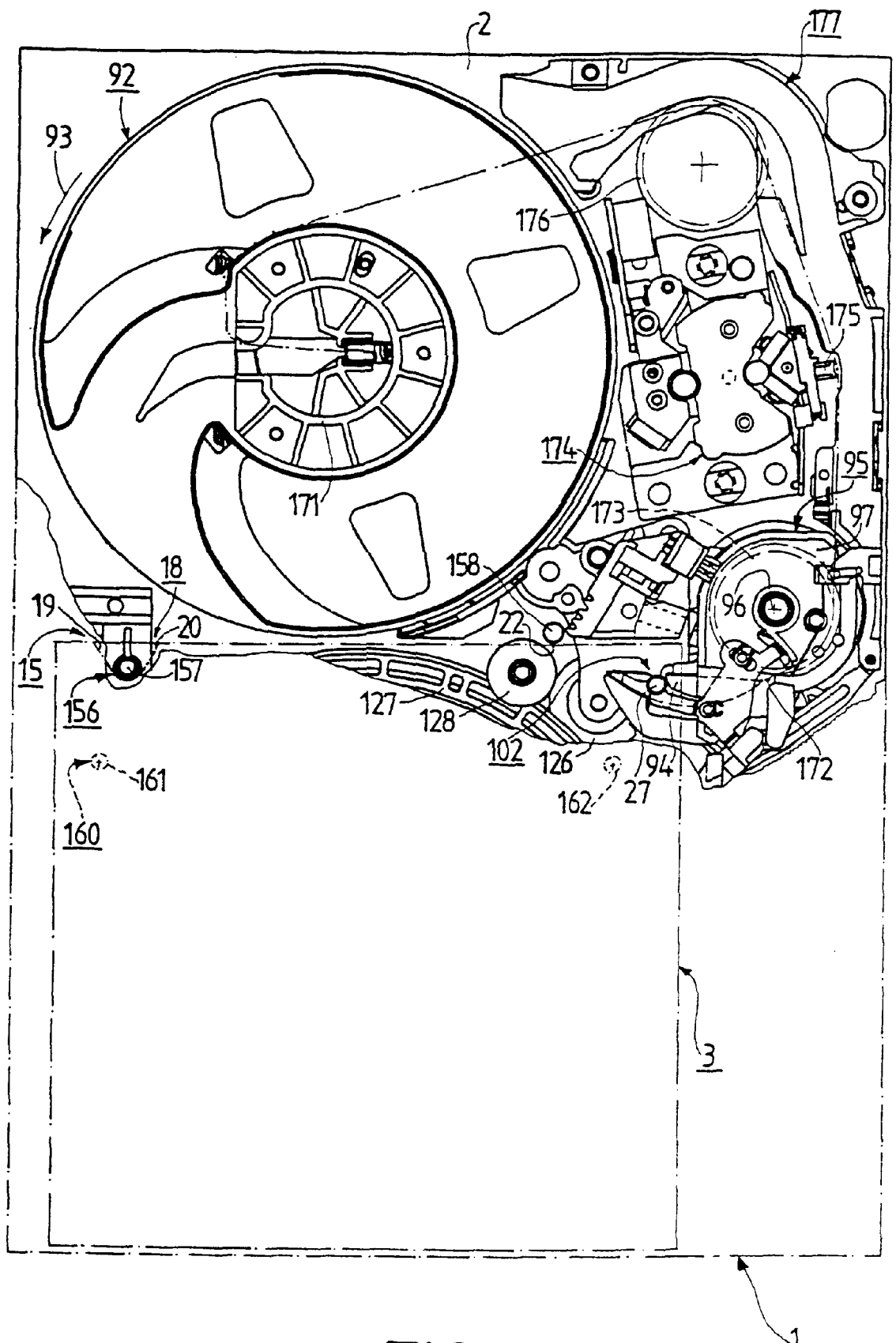
FIG. 5 shows the recording and reproducing device of FIG. 1 in basically the same way as FIG. 1 but only in part, the inserted cassette being in its operating position and a pull-out element of the device being coupled to the coupling pin of the cassette so as to form a pull-out assembly.

The cassette 3 further has two positioning posts which project from the bottom wall 8 into the cassette interior, a positioning post 36 being visible through the access opening 23 in FIG. 2. Each of the positioning posts 36, as is shown in FIG. 4, has a blind hole which serve as final positioning holes 37 and 38 for definitively positioning the cassette 3 in the device 1 when the cassette 3 assumes its operating position in the device 1, as will be described in more detail hereinafter. The first final positioning hole 37 has an elongate cross-sectional shape. The second final positioning hole 38 is of circular cross-section. The two final positioning holes 37 and 38 together form the final positioning means 39 of the cassette.

In the bottom wall 8, a circular aperture 40 has been formed, through which drive teeth 41 of the supply reel 25 can be accessed by a reel drive device of the device 1 for rotationally driving the supply reel 25.

The cassette 3 further has a first locking recess 42 and a second locking recess 43. The two locking recesses 42 and 43 are open towards the bottom wall 8 of the cassette 3. The bounding wall of each of the two locking recesses 42 and 43, situated nearest the front cassette wall 9, forms a locking wall 44, only a locking wall 44 of the second locking recess 43 being visible in the Figures. (see FIGS. 3, 20 and 21).

It is to be noted that the cassette 3 can be inserted into the device 1 in a direction of insertion indicated by an arrow 45 in FIGS. 1, 2, 3, 4,17, 18, 19, 20, 21, 22, 23, 24, 25, 26 and 27. Insertion may also be referred to as introduction or loading.

Figure 28:
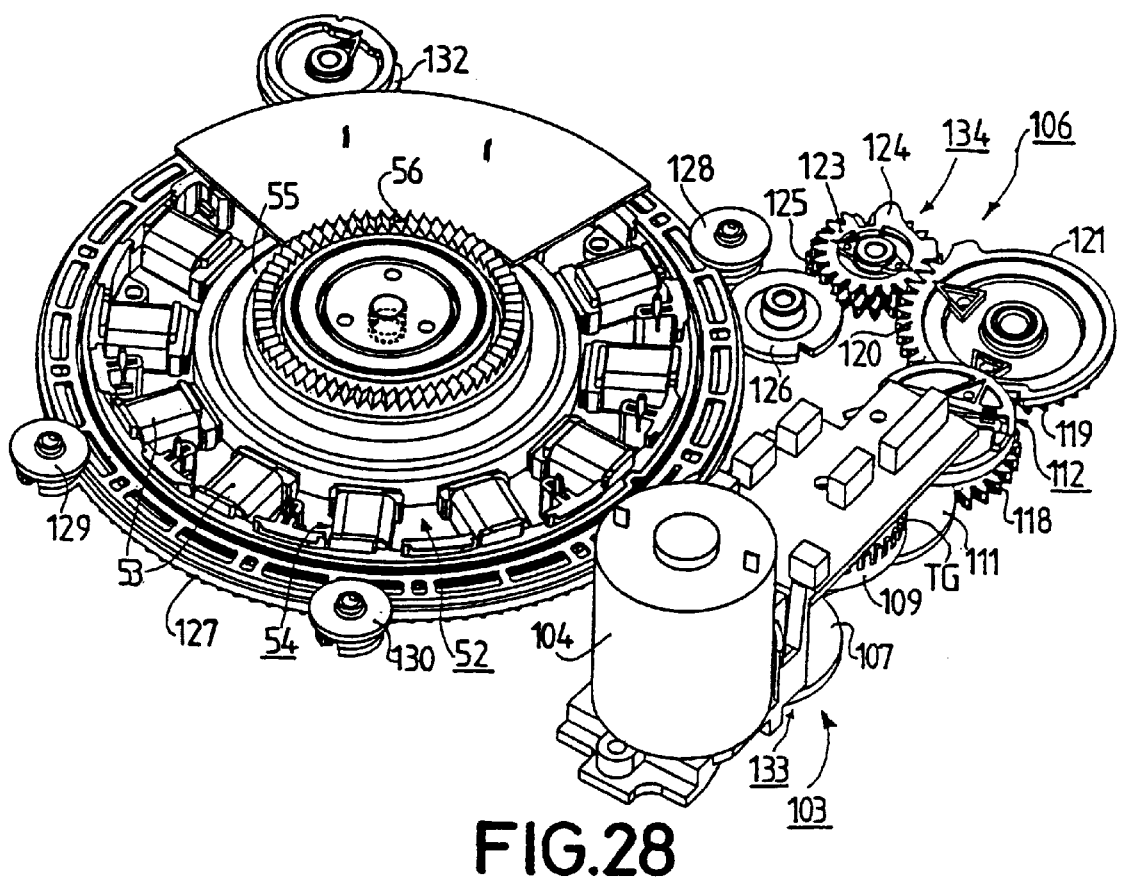
FIG. 28 is an oblique plan view showing a reel drive device of the recording and reproducing device as shown in FIG. 1, for rotationally driving the supply reel accommodated in the cassette.

For holding the cassette 3, the device 1 has holder means 46 formed by a cassette holder 46. The cassette holder 46 is essentially box-shaped and comprises an upper holder wall 47 and two holder side walls, i.e., a left-hand holder side wall 48 and a right-hand holder side wall 49, which are integral with the upper holder wall 47 and project from the upper holder wall 47 towards the chassis 2, as well as two holder bottom wall portions, i.e., a left-hand holder bottom wall portion 50 and a right-hand holder bottom wall portion 51, which project from the holder side walls 48 and 49 and which extend towards one another. The two holder bottom wall portions 50 and 51 are spaced at such a distance from one another that there is adequate room for a reel drive device 52 of the device 1, shown in FIG. 28, between the two holder bottom wall portions 50 and 51.

Figure 6:
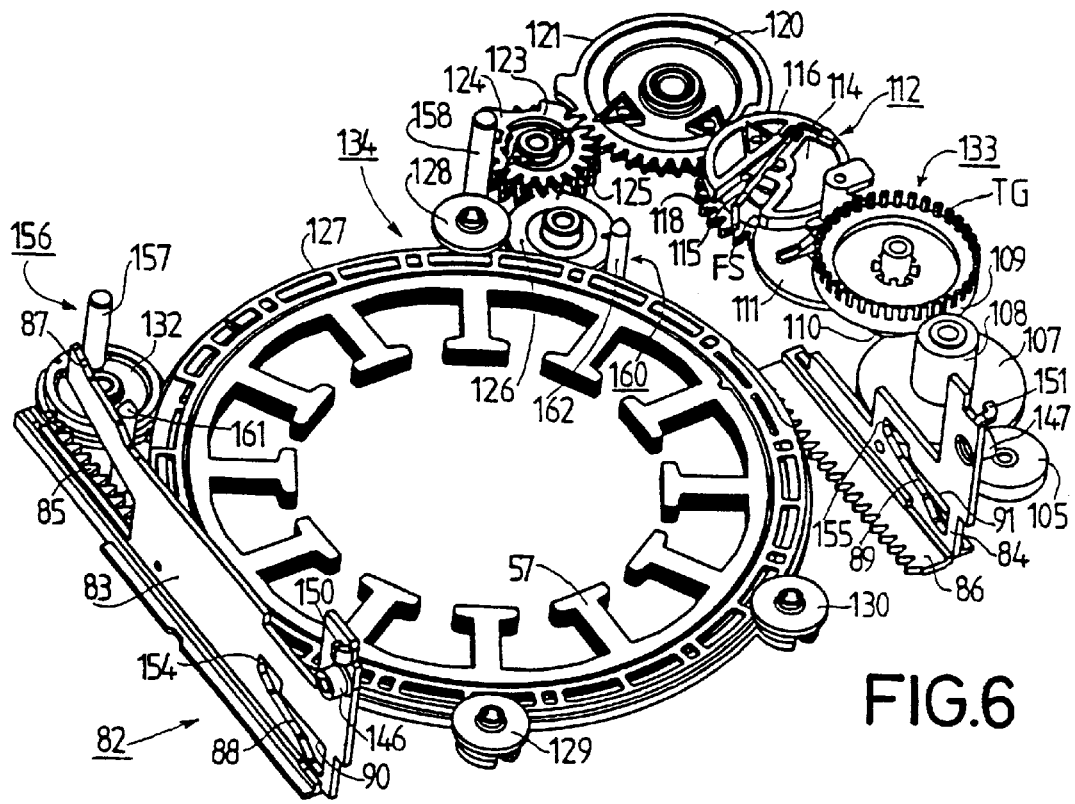
FIG. 6 is an oblique plan view showing drive means of the recording and reproducing device of FIG. 1, the drive means being adapted to actuate retaining means for the pull-out element and to actuate holder means for holding a cassette.
Figure 7:
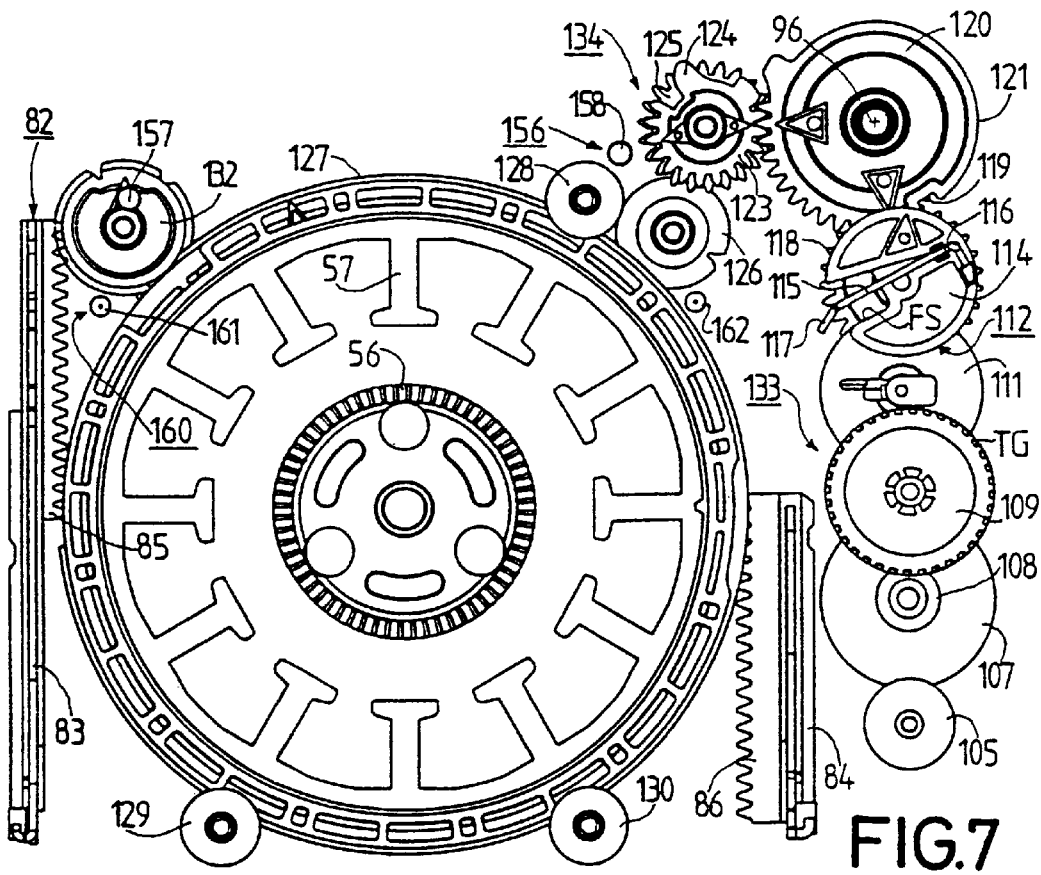
FIG. 7 is a plan view showing the drive means of FIG. 6.

The reel drive device 52 forms record carrier drive means and includes a drive motor M comprising a stator 54, having a plurality of stator coils 53, and a rotor 55 which cooperates with the stator 54 and which is coupled to drive teeth 56 in order to drive said drive teeth 56. By means of the drive teeth 56 of the reel drive device 52, the drive teeth 51 of the supply reel 25 of the cassette 3 can be driven. FIGS. 1, 6 and 7 only show the stator lamination assembly 57 of the stator 54 of the reel drive device 52 to represent the whole reel drive device 52.

Figure 17:
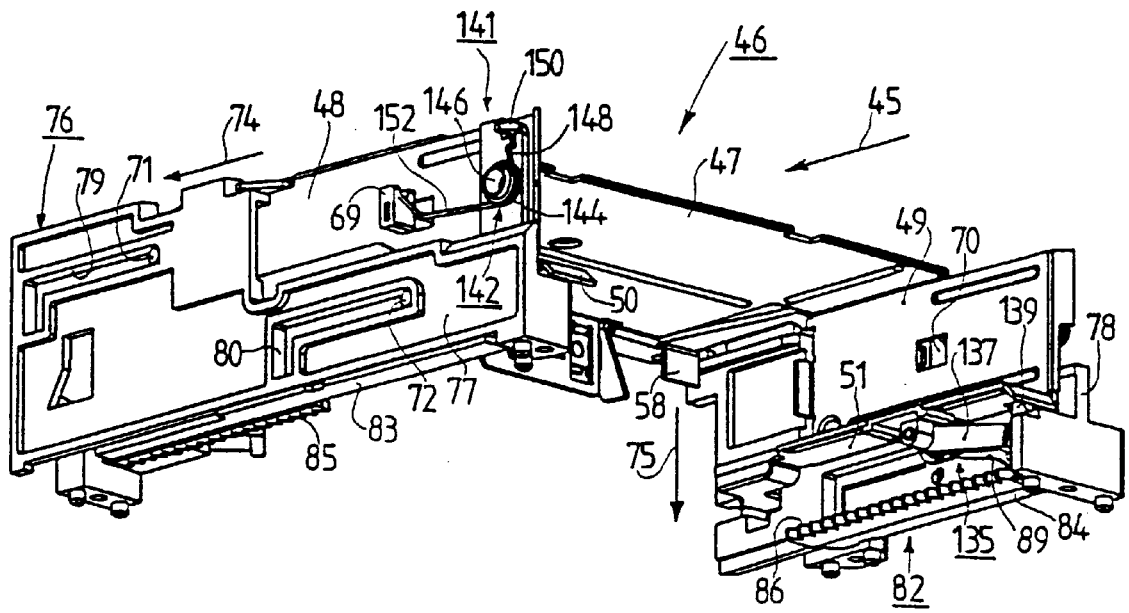
FIG. 17 shows the holder means of the recording and reproducing device of FIG. 1 in an oblique view from underneath.

The cassette holder 46, see FIG. 17, comprises two insertion-limiting limbs 58 which project from its upper holder wall 47 towards the chassis 2, an insertion limiting limb 58 being visible in FIG. 17. When a cassette 3 is inserted into the cassette holder 46, the front side wall 9 of the cassette 3 abuts against the insertion limiting limb 58, after which the cassette holder 46 is moved in the direction of insertion 45 by means of the manually-inserted cassette 3.

The cassette holder 46 further comprises, see FIGS. 1 and 19, a first latching lever 59 and a second latching lever 60, which are supported on the cassette holder 46 so as to be pivotable about respective pivots 61 and 62. Each of the latching levers 59 and 60 has a sensing portion 63 or 64, respectively. The sensing portions 63 and 64 project into the holder space of the cassette holder 46, as a result of which, the sensing portions 63 and 64 are moved against the action of springs, not shown, at the end of the insertion of a cassette 3. As a result of such a movement, the latching hooks 65 and 66, provided on the latching levers 59 and 60, are pivoted towards one another and are thus moved away from two latching projections 67 and 68 so far that during a subsequent movement of the cassette holder 46 in the direction of insertion 45, the latching hooks 65 and 66 can no longer enter into latching engagement with the latching projections 67 and 68. The latching projections 67 and 68 each project from a guide wall to be described hereinafter. The latching levers 59 and 60 guarantee that the cassette holder 46 cannot be moved in the direction of insertion 45 if no cassette 3 is present in the cassette holder 46 or has not been inserted fully into cassette holder 46.

The cassette holder 46 further comprises two stops 69 and 70, see FIGS. 1 and 17 to 27. The first stop 69 is connected to the left-hand holder side wall 48, the first stop 69 projecting outwardly from the left-hand holder side wall 48. Likewise, a second stop 70 is connected to the right-hand holder side wall 49. The two stops 69 and 70 are adapted to cooperate with spring means, which will be described in more detail hereinafter.

The cassette holder 46 further comprises three holder pins 71, 72 and 73, in total, see FIGS. 17, 18 and 22 to 27. The first holder pin 71 and the second holder pin 72 project outwardly from the left-hand holder side wall 48. The third holder pin 73 projects outwardly from the right-hand holder side wall 49. The three holder pins 71, 72 and 73 are provided both for guiding purposes and for actuating purposes. Thus, the three holder pins 71, 72 and 73 form guide pins as well as actuating pins.

Figure 22:
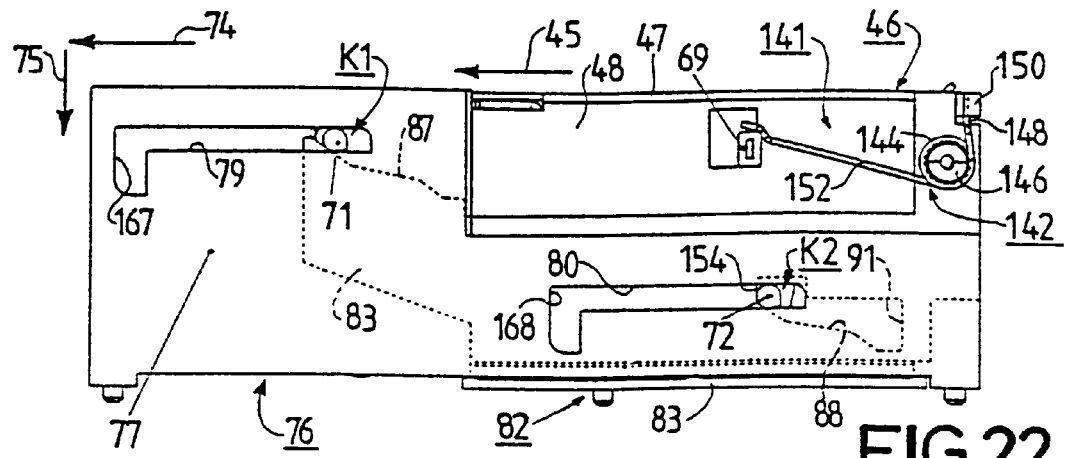
FIG. 22 is a side view showing a part of the recording and reproducing device of FIG. 1, which part includes a guide wall, an actuating slide and the holder means, the holder means being shown in the loading position and no cassette being present in the holder means.
Figure 23:
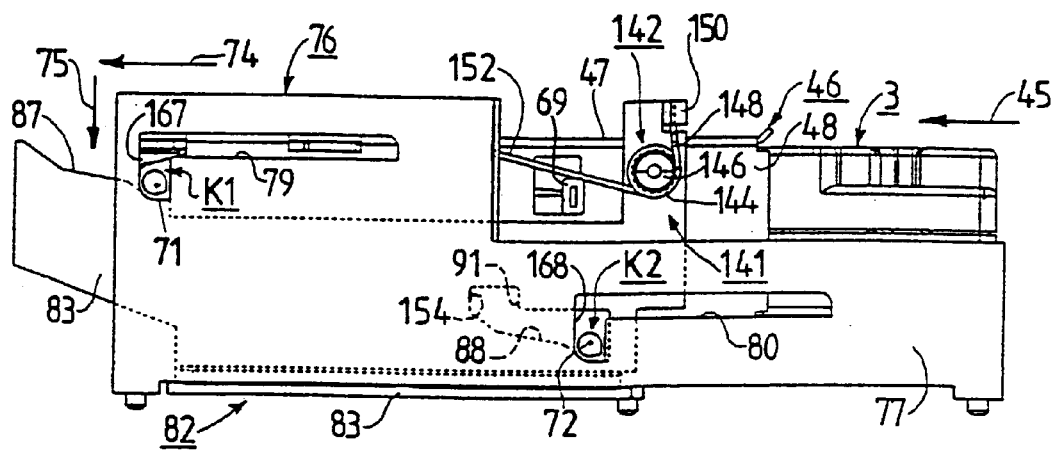
FIG. 23 shows the same part of the recording and reproducing device of FIG. 1 in a manner similar to FIG. 22, the holder means being in the operating position and a cassette inserted in the holder means being also in the operating position.
Figure 24:
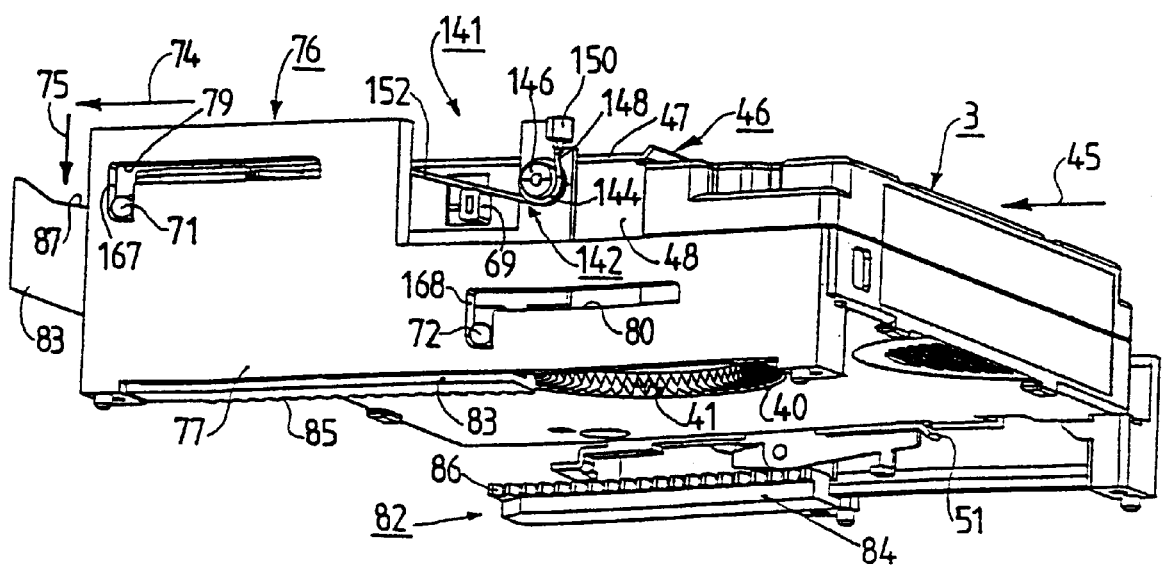
FIG. 24 is an oblique underneath view showing the same part of the recording and reproducing device of FIG. 1 as FIG. 23.
Figure 25:
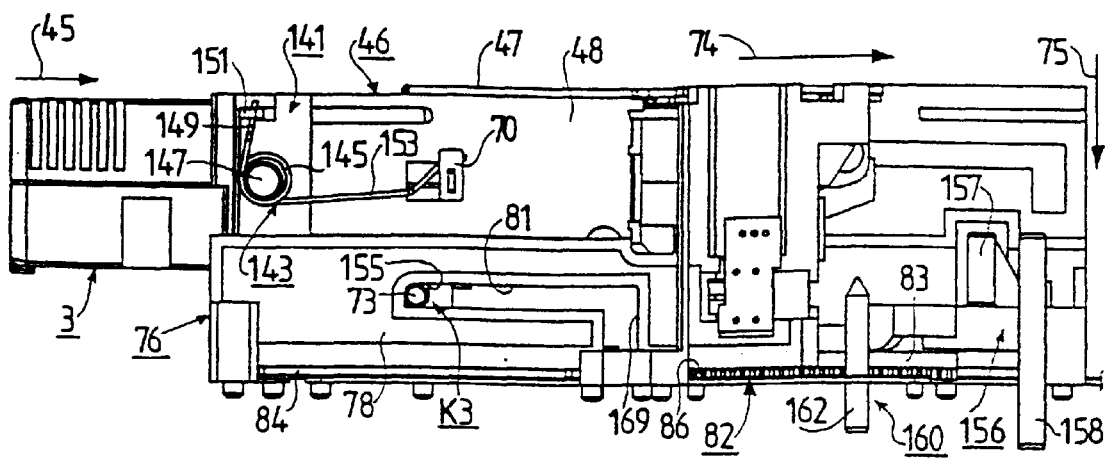
FIG. 25 is a side view showing a part of the recording and reproducing device of FIG. 1, which comprises the holder means including the actuating slides and the guide means for the holder means and, in addition, comprises positioning means and final positioning means for the cassette, the holder means being shown in the loading position and a cassette being shown wholly inserted in the holder means.
Figure 26:
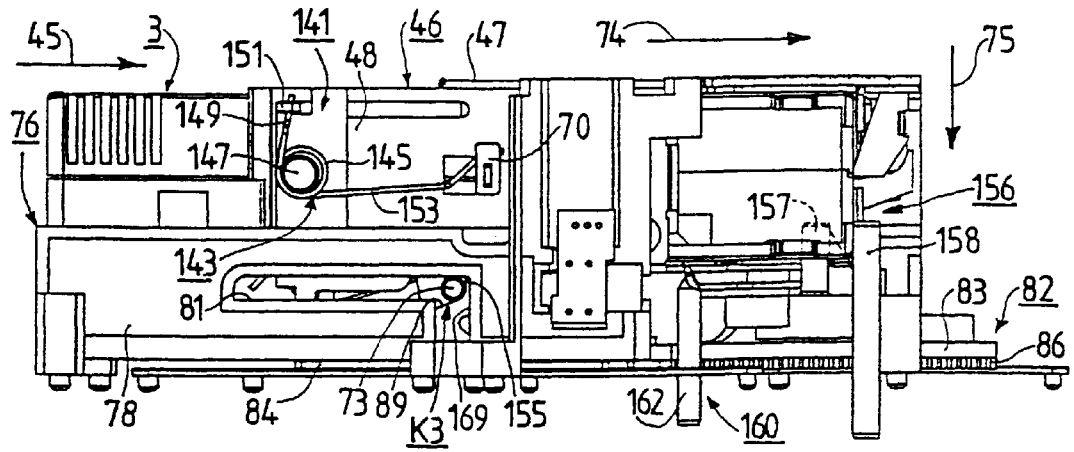
FIG. 26 is a view similar to FIG. 25, showing the same part of the recording and reproducing device of FIG. 1, the holder means being shown in an intermediate position occupied at the end of the movement in a first direction of movement.
Figure 27:
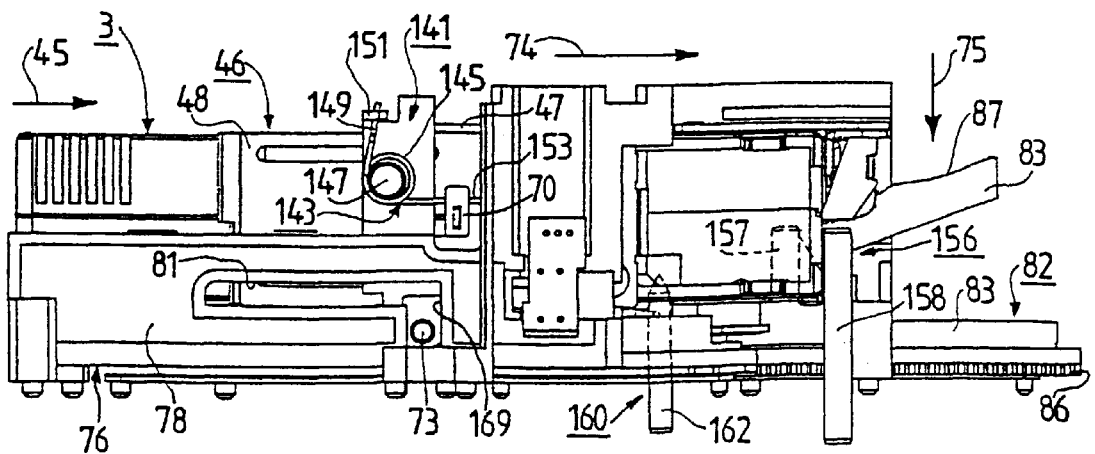
FIG. 27 is a view similar to FIGS. 25 and 25, showing the same part of the recording and reproducing device of FIG. 1, the holder means being shown in the operating position.

The cassette holder 46 is movable between a loading position, shown in FIGS. 1, 20, 21, 22 and 25, in which the cassette 3 can be inserted into the cassette holder 46, and an operating position, shown in FIGS. 23, 24 and 27, in which the cassette 3 inserted in the cassette holder 46 occupies its operating position. The cassette holder 46 is moved, in a manner known per se, along an L-shaped path of movement, the cassette holder 46 first being moved from the loading position in a first direction of movement 74 parallel to the direction of insertion 45 into an intermediate position shown information FIG. 26 and, subsequently, it is moved into the operating position in a second direction of movement 75 towards the chassis 2 perpendicularly to the first direction of movement 74.

In order to obtain this direction of movement, the device 1, see FIGS. 1, 17, 18, 19 and 22 to 27, has guide means 76 including a first guide wall 77 and a second guide wall 78. The first guide wall 77 has a first L-shaped guide channel 79 and a second L-shaped guide channel 80. The second guide wall 78 has a third guide channel 81. The first holder pin 71 engages in the first guide channel 79. The second holder pin 72 engages in the second guide channel 80. The third holder pin 73 engages in the third guide channel 81. The three guide channels 79, 80 and 81 and the three holder pins 71, 72 and 73 guarantee a trouble-free guidance of the cassette holder 45.

The device 1 has actuating means 82 for moving the cassette holder 45, see FIGS. 1, 6, 7, 17, 18, 19 and 22 to 27. The actuating means 82 includes a first actuating slide 83 situated at one side with respect to the reel drive device 52 and a second actuating slide 84 situated at the other side with respect to the reel drive device 52, as is apparent from FIGS. 6 and 7. The two actuating slides 83 and 84 are guided so as to be slidable parallel to a sliding direction which corresponds to the direction of insertion 45 of the cassette 3 and to the first direction of movement 74 of the cassette holder 46. The first actuating slide 83 is integral with a first drive gear rack 85. The second actuating slide 84 is integral with a second drive gear rack 86. The first actuating slide 83 has a first cam surface 87 and a second cam surface 88. The second actuating slide 84 has a third cam surface 89. The first cam surface and the first holder pin 71 form a first cam-and-follower device K1, in which the first holder pin 71 forms a cam follower. The second cam surface 88, which is formed by a bounding surface of a recess 90 in the first actuating slide 83, and the second holder pin 72 form a second cam-and-follower device K2, in which the second holder pin 72 also forms a cam follower. The third cam surface 89, which is formed by a bounding surface of a recess 91 in the second actuating slide 84, and the third holder pin 73 form a third cam-and-follower device K3, in which the third holder pin 73 also constitutes a cam follower. By means of the cam surfaces 87, 88 and 89 and the holder pins 71, 72 and 73 used as cam followers, the cassette holder 46 is movable by moving the actuating slides 83 and 84.

As is apparent from the foregoing, each of the three cam-and-follower devices K1, K2 and K3 in the device 1 advantageously have only one cam surface 87, 88 or 89, respectively.

As is apparent from, FIG. 1, the device 1 further includes a rotationally drivable take-up reel 92. The take-up reel 92 is rotationally drivable by a reel drive motor, not shown. The take-up reel 92 serves for taking up the magnetic tape 26 accommodated in the cassette 3. In order to wind the magnetic tape 26 onto the take-up reel 92, the take-up reel should be driven in the direction indicated by an arrow 93.

In order to enable the magnetic tape 26 contained in the cassette 3 to be wound onto the take-up reel 92, the magnetic tape 26 should first be brought to the take-up reel 92 with the aid of the coupling pin 27. For this purpose, the device 1 has a pull-out element 94, which is shown in FIGS. 1, 5, 14, 15 and 16. The pull-out element 94 is adapted to be coupled to the coupling pin 27. In order to enable the pull-out element 94 to be coupled to the coupling pin 27, the device 1 includes retaining means 95 adapted to detachably retain the pull-out element 94, the retaining means being movable between a standby position shown in FIGS. 1, 11, 12, 14 and 15 and an operating position shown in FIGS. 5, 13 and 16. In the device 1, the retaining means 95 is mounted so as to be pivotable about a pivotal axis 96.

Figure 11:
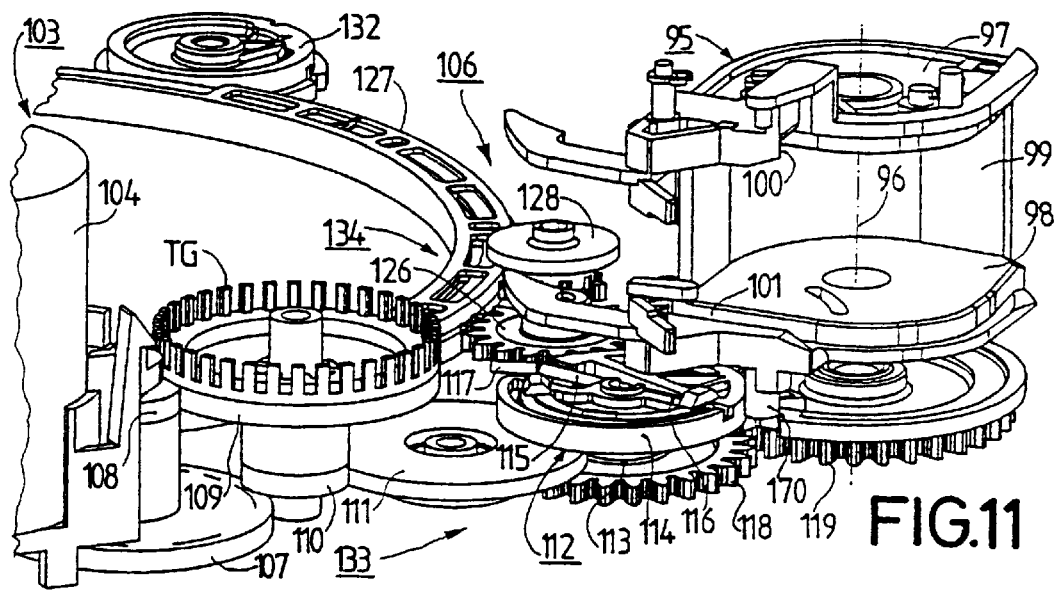
FIG. 11 is an oblique plan view showing a part of the drive means of FIGS. 6 and 7, the drive elements shown being represented in a situation in which the retaining means is in the standby position and the holder means in the loading position.
Figure 12:
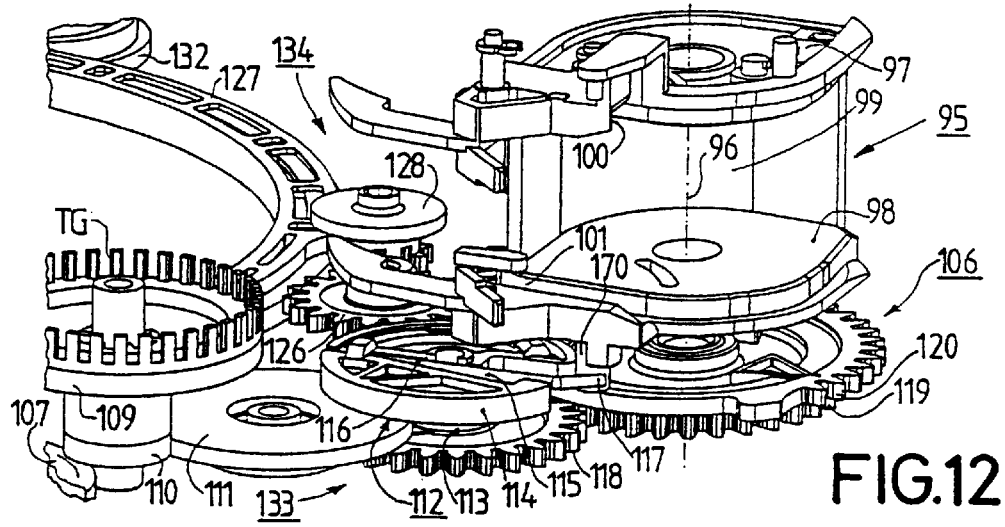
FIG. 12 shows a part of the drive means in a manner similar to FIG. 11, the drive elements shown being represented in a situation in which the retaining means is in the standby position and the holder means in the operating position.
Figure 13:
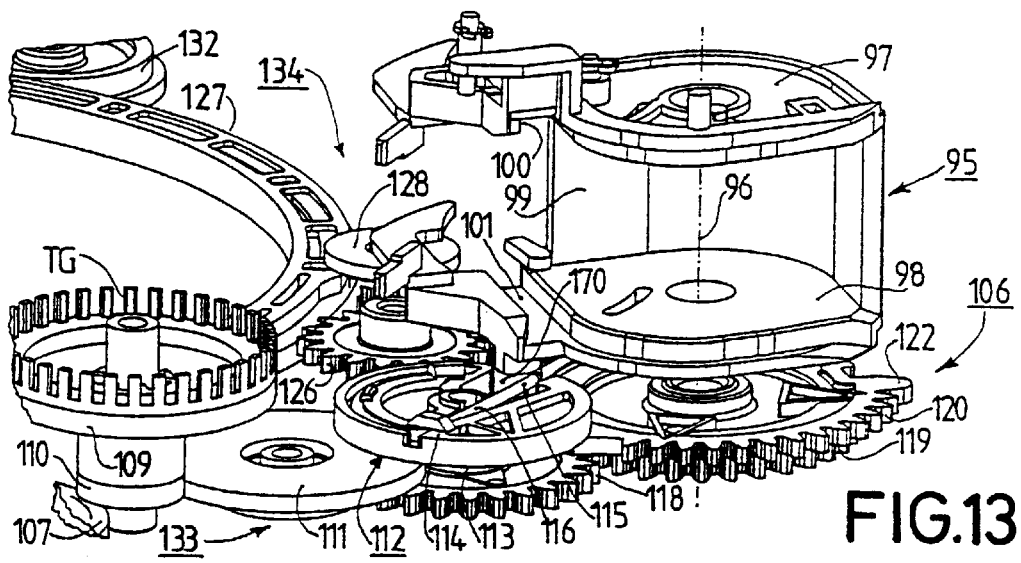
FIG. 13 shows a part of the drive means in a manner similar to FIGS. 11 and 12, the drive elements shown being represented in a situation in which the retaining means is in the operating position and the holder means also in their operating position.
Figure 14:
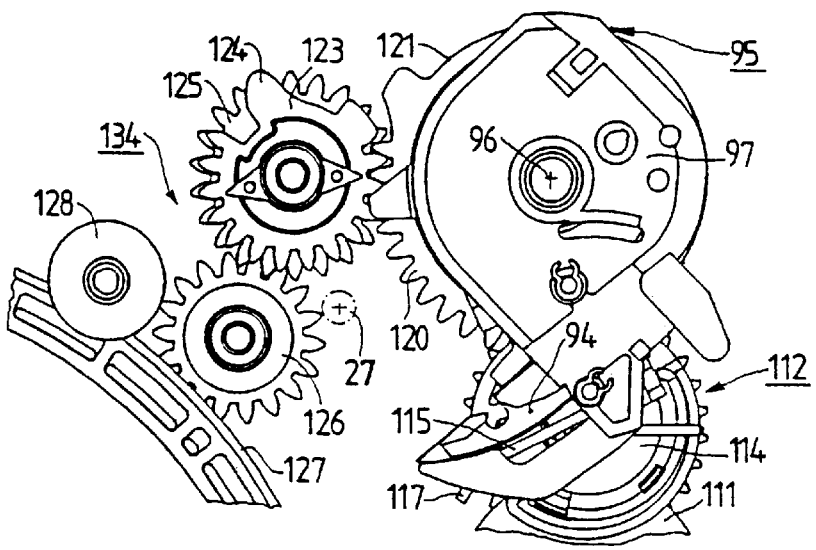
FIG. 14 is a plan view of the same part of the drive means as shown in FIGS. 8, 9 and 10, while in addition the retaining means is shown in the standby position.
Figure 15:
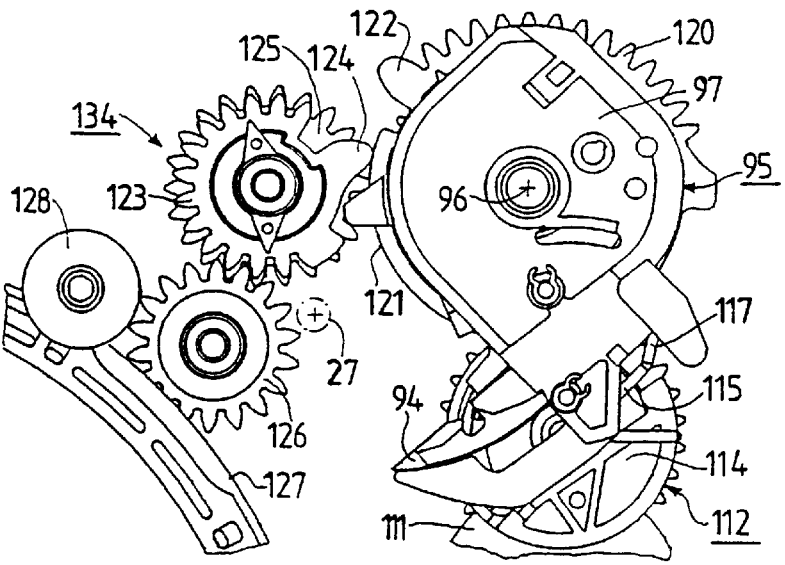
FIG. 15, in a manners similar to FIG. 14, shows a part of the drive means and the retaining means, which is shown in the standby position.
Figure 16:
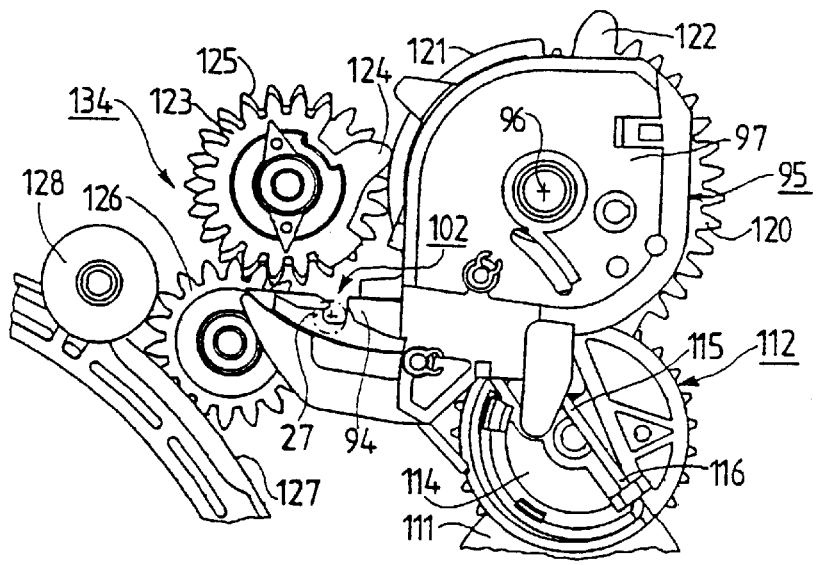
FIG. 16, in a manner similar to FIGS. 14 and 15, shows a part of the drive means and the retaining means, which is shown in the operating position.

The retaining means 95, as is apparent from FIGS. 11, 12 and 13, is substantially U-shaped and comprises two substantially planar retaining limbs 97 and 98 interconnected by a web 99. The pull-out element 94 is retained between the two retaining limbs 97 and 98, the pull-out element 94 being guided by guide elements, not shown, in respective guide channels 10 and 101 of the retaining means 95 and, in a manner not shown, the pull-out element 94 being held in a given initial position, i.e., in an area in which coupling with the coupling pin 27 is possible and, as a result of this, a pull-out assembly 102, consisting of the pull-out element 94 and the coupling pin 27 coupled to this element, can be formed. Said pull-out assembly 102 is visible in FIG. 5 and also in FIG. 16, the coupling pin 27 being shown only diagrammatically as a dash-dot line in FIG. 16. It is to be noted that after the pull-out element 94 has been coupled to the coupling pin 27, the pull-out element 94 together with the coupling pin 27, i.e., said pull-out assembly 102, can be detached by the retaining means 95, which will not be described in any further detail here.

Figure 8:
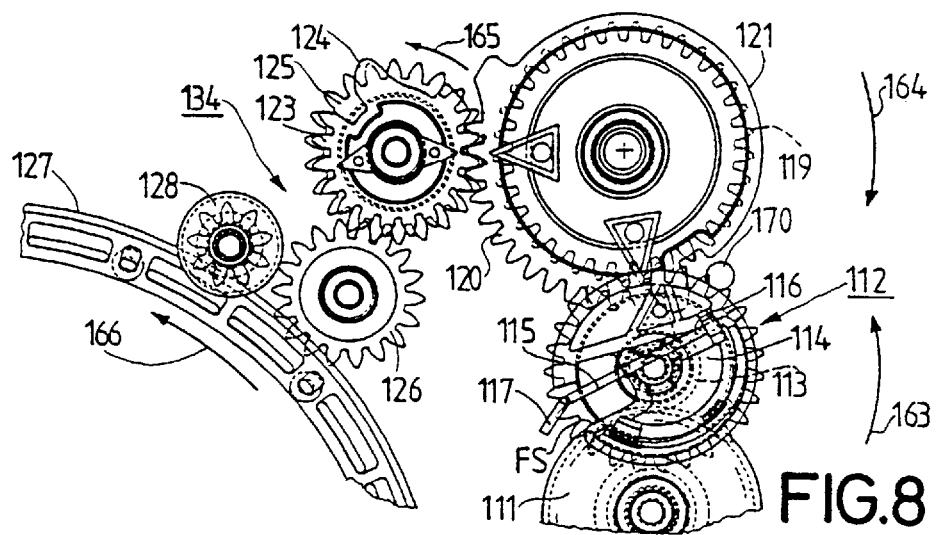
FIG. 8 is a plan view showing a part of the drive means of FIGS. 6 and 7, the drive elements shown being represented in a situation in which the retaining means is in the standby position and the holder means in the loading positions.
Figure 9:
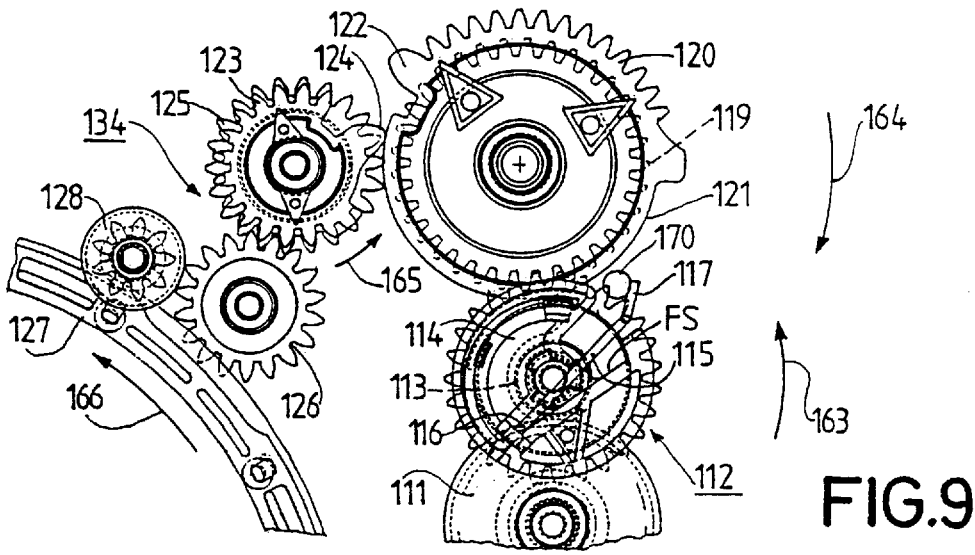
FIG. 9, in a manner similar to FIG. 8, shows a part of the drive means, the drive elements shown being represented in a situation in which the retaining means is in the standby position and the holder means in the operating position.
Figure 10:
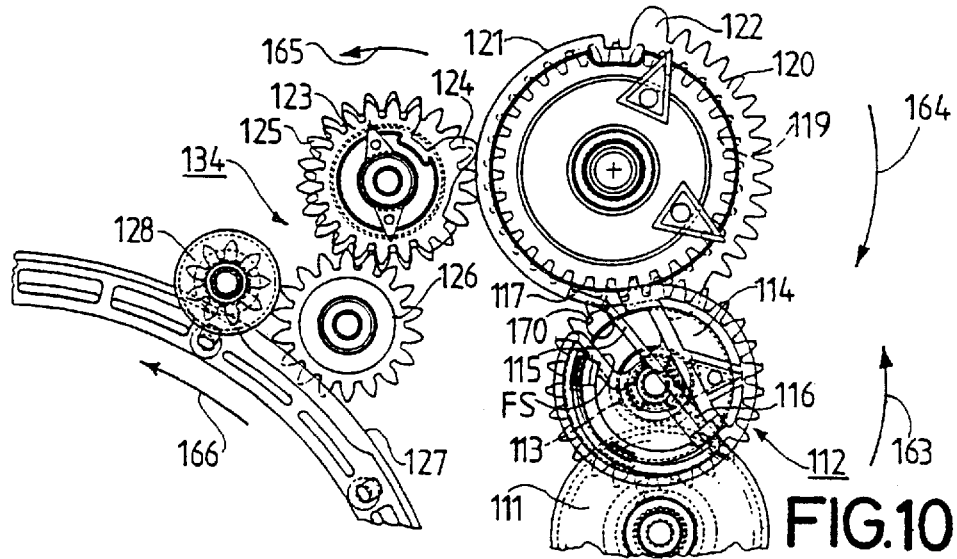
FIG. 10, in a manner similar to FIGS. 8 and 9, shows a part of the drive means, the drive elements shown being represented in a situation in which the retaining means is in the operating position and the holder means in the operating position.

In order to enable both the cassette holder 46 and as the retaining means 95 to be moved in an advantageous manner, the device 1 has drive means 103, which will be described hereinafter with reference to FIGS. 1, 6 to 16 and 28. The drive means 103 includes a motor 104 and a gear wheel transmission 106 which is drivable by a motor pinion 105 and whose construction is apparent from FIGS. 6 to 16. The gear wheel transmission 106 comprises the following transmission elements, i.e., gear wheels. The motor pinion 105 is in mesh with a first gear wheel 107 which is integral with a coaxial second gear wheel 108. The second gear wheel 108 meshes with a third gear wheel 109 having tacho-teeth TG of a photoelectric tacho-generator. The third gear wheel 109 is coaxial with a fourth gear wheel 110, which is in mesh with a fifth gear wheel 111. The fifth gear wheel 111 can drive a retaining-means drive gear wheel 112 having a tooth portion 113 and a mounting portion 114. The mounting portion 114 serves to carry, or hold, spring means 115 formed by a rod spring having one end fixed to the mounting portion 114 and having another end 117 which serves to move the retaining means 95. The retaining-means drive gear wheel 112 is coaxial with a sixth gear wheel 118, which is in mesh with a seventh gear wheel 119, which is coaxial with the pivotal axis 96 of the retaining means 95. The seventh gear wheel 119 is integral with a coaxial eighth gear wheel 120, which has a toothless circumferential portion 121 and one extended tooth 122. The eighth gear wheel 120 cooperates with a ninth gear wheel 123, which also has one extended tooth 124. The ninth gear wheel 123 is coaxial with a tenth gear wheel 125. The tenth gear wheel 125 is in mesh with an eleventh gear wheel 126. The eleventh gear wheel 126 is in mesh with a ring-shaped gear wheel 127, whose teeth are not shown to simplify the Figures. The ring-shaped gear wheel 127 is rotatable with the aid of three bearing rollers 128, 129 and 130, which each have driving teeth 131 which are in mesh with the teeth of the ring-shaped gear wheel 127, as can be seen in FIGS. 8, 9 and 10 for the first bearing roller 128. The ring-shaped gear wheel 127 is in mesh with an intermediate gear wheel 132, which serves for direction reversal. The ring-shaped gear wheel 127 is directly in mesh with the second drive gear rack 86. The ring-shaped gear wheel 127 cooperates with the first drive gear rack 85 via the intermediate gear wheel 132 for direction reversal.

The gear wheel transmission 106 has a first transmission section 133 between the motor pinion 105 and the retaining-means drive gear wheel 112, and a second transmission section 134 between the retaining-means drive gear wheel 112 and the two cassette holder drive gear racks 85 and 86, the second transmission section 134 including means for stopping a transmission of power from the retaining-means drive gear wheel 112 to the two drive gear racks 85 and 86. In the present case, stopping means comprise the eighth gear wheel 120 and the ninth gear wheel 123, which cause the transmission of power from the retaining-means drive gear wheel 112 to the two drive gear racks 85 .and 86 to be discontinued when the toothless circumferential portion 121 of the eighth gear wheel 120 faces the ninth gear wheel 123.

When the cassette 3 is inserted by hand into the cassette holder 46, which is in the loading position as shown in FIGS. 1, 17, 18, 19, 20, 21, 22 and 25, the cassette 3 abuts against the sensing portions 63 and 64 of the two latching levers 59 and 60 at the lend of the insertion movement, as a result of which,the latching hooks 65 and 66 are pivoted in such a manner that the latching hooks can no longer be blocked by the latching projections 67 and 68 which project from the two guide walls 77 and 78.

Moreover, locking means 135 connected to the cassette holder 46 is activated at the end of the insertion movement of the cassette 3 into the cassette holder 46. The parts of the locking means 135 are shown in FIGS. 17, 18, 20 and 21. The locking means 135 comprises a first locking lever 136, which is pivotably mounted on the cassette holder 46, and a second locking lever 137, which is also pivotably mounted on the cassette holder 46. The free end of each of the two locking levers 136 and 137 is a locking hook 138 and 139, respectively. Spring means 140 act upon each of the two locking levers 136 and 137 and are formed by respective wire springs which urge the respective locking levers 136 and 137 towards a locking position of the respective locking lever 136 or 137, the locking position being shown in FIG. 21. The two locking levers 136 and 137 are pivoted away from the upper holder wall 47 by a cassette 3 against the force of the spring means 140 during insertion of the cassette 3 into the cassette holder 46. As soon as the cassette 3 has been inserted wholly into the cassette holder 46, as is shown in FIG. 21, the locking levers 136 and 137 are pivoted into their locking positions under the influence of the force of the spring means 140, each of the locking levers 136 and 137 then engaging the respective locking recess 42 or 43 of the cassette 3 with its respective locking hook 138 or 139 and, thereby, engaging behind the relevant locking wall 44 of the cassette 3. Thus, the cassette 3 is locked in the cassette holder 46 and the cassette 3 can only be moved to a small extent out of its fully inserted position in a direction opposite to the direction of insertion 45.

At the end of the insertion of movement of the cassette 3 into the cassette holder 46, the cassette 3 abuts against the insertion limiting limbs 58 of the cassette holder 46, as a result of which, the cassette holder 46 performs a small movement in the direction of insertion 45 and the first direction of movement 74 which is parallel thereto. This small movement of the cassette holder 46 is detected by a photoelectric sensor, in response to which, the motor 104 of the drive means 103 is turned on via the sensor. As a result of this, the retaining-means drive gear wheel 112 is driven via the first transmission section 133 of the gear wheel transmission 106, and the ring-shaped gear wheel 127 is also driven via the second transmission section 134. As a result of this, the two drive gear racks 85 and 86 and, consequently, the two actuating slides 83 and 84 are moved in the first direction of movement 74, as a result of which the cassette holder 46 is moved from the loading position shown in FIGS. 1, 17, 18, 19, 20, 21, 22 and 25 into the operating position shown in FIGS. 23, 24 and 27, in which the cassette 3 occupies the operating position shown in FIG. 5.

Figure 18:
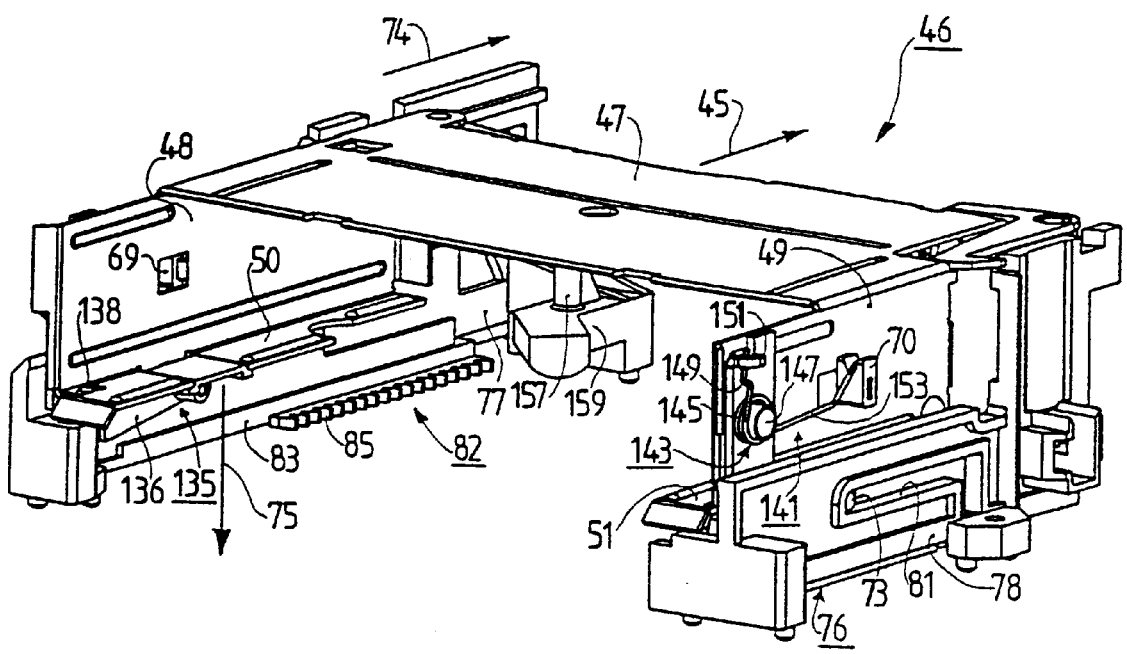
FIG. 18 shows the holder means of FIG. 17 in an oblique plan view.

Hereinafter, the means for moving the cassette holder 46 from its loading position into its operating position will be described in detail, reference being made particularly to FIGS. 22 to 27. In addition to the afore-mentioned cam surfaces 87, 88 and 89 and the holder pins 71, 72 and 73 used as cam followers, the actuating means includes spring means 141, which is shown in FIGS. 1, 17, 18, 19 and 22 to 27. The spring means 141 comprises two wire springs 142 and 143, which each take the form of a two-arm torsion spring. Each of the two wire springs 142 and 143 is fitted onto a pin-like cylindrical spring mount, 146 and 147 respectively, each of the spring mounts 146 and 147, being,connected to a respective one of the actuating slides 83 and 84 and projecting laterally from the respective actuating slide 83 or 84. A first arm 148 or 149 of each wire spring 142 or 143 engages against a respective stop 150 or 151 of the relevant actuating slide 83 or 84, and the second arm 152 or 153 engages against the relevant stop 69 or 70 of the cassette holder 46. Each of the second arms 152 or 153 is angled in an arena intended for cooperation with the respective stop 69 or 70 of the cassette holder 46, as can be seen in FIGS. 17, 18 and 22.

In the manner described in the foregoing, it is achieved that the spring means 141 acts between the two actuating slides 83 and 84 and the cassette holder 46, namely, in such a manner that during a movement of the actuating slides 83 and 84 in the direction of insertion of the two actuating slides 83 and 84, i.e., in the first direction of movement 74, the spring means 141 first causes the cassette holder 46 to move in the first direction of movement 74, and subsequently causes the cassette holder 46 to move in the second direction of movement 75. As a result of the provision of the springs means 141, it is also achieved that the spring means 141 permanently urges the cam followers, which cooperate with the respective single cam surfaces 87, 88, 89 of the three cam-and-follower devices K1, K2 and K3, i.e., the holder pins 71, 72 and 73 respectively, towards said respective single cam surface 87, 88 or 89.

As is apparent particularly from FIGS. 22 and 23, each single cam surface 87, 88 or 89 of each respective cam-and-follower device K1, K2 or K3 is slightly S-shaped. FIGS. 6, 22, 23, 25 and 26 further show that the second cam surface 88 and the third cam surface each have, at one end, a surface portion 154 or 155 which extends transversely to the direction of insertion, i.e., transversely to the first direction of movement 74, against which the associated cam follower, i.e. the holder pin 72 or 73, is urged under the force of the spring means 141 when the cassette holder 154 is in its loading position.

As can be seen in FIGS. 1, 5, 6, 7 and 21 to FIG. 27, the device 1 includes positioning means 156, which, in the present case, is formed by two positioning pins 157 and 158 which extend transversely to the first direction of movement 74. In the device 1, both the first positioning pin 157 and the second positioning pin 158 extend exactly parallel to the second direction of movement 75. However, it is alternatively possible that, for example, the second positioning pin 158 extends parallel to the front side wall 9 of the cassette 3, but extends at an angle with respect to the second direction of movement 75, i.e., is inclined with respect to the chassis 2. The first positioning pin 157 is carried by a mounting arm 159 which is integral with the first guide wall 77, mounting arm projecting from the guide wall 77 and extends over the intermediate gear wheel 132 for direction reversal. The second positioning pin 158 is connected directly to the chassis 2. The two positioning pins 157 and 158 are arranged and constructed for cooperation with the positioning means 15 of the cassette, i.e., with the two positioning walls 19 and 20 of the wedge-shaped recess 18 and the positioning portion 22 of the front side wall 9. The cassette-mounted positioning means 15 and the device-mounted positioning means 156 are arranged and adapted to position the cassette 3, in directions parallel to the bottom wall 8 thereof, with respect to the drive means for the magnetic tape 26, i.e. with respect to the reel-drive device 52 (see FIG. 28) for driving the supply reel 25 accommodated in the cassette 3. The cassette-mounted positioning means 15 and the device-mounted positioning means 156 are advantageously arranged and constructed in such a manner that during the movement of the cassette holder 46 from the loading position into the operating position, the cassette 3 can positioned with the aid of the cooperating positioning means 15 and 156 already at the end of the movement of the cassette holder 46 in the first direction of movement 74 and during the subsequent movement in the second direction of movement 75 before the cassette holder 46 has reached the operating position and before the reel drive device 52 enters into operative engagement, i.e., driving engagement, with the magnetic tape 26 of the cassette 3, i.e. before the drive teeth 56 of the reel drive device 52 come into mesh with the drive teeth 51 of the supply reel 25 of the cassette 3.

The device 1, see FIGS. 1, 5, 6, 7 and 21 to 27, in addition includes device-mounted final positioning means 160. The device-mounted final positioning means 160 is now formed by two final positioning pins 161 and 162, the first final positioning pin 161 being arranged adjacent the intermediate gear wheel 132 for direction reversal, and the second final positioning pin 162 being arranged adjacent the eleventh gear wheel 126. The two final positioning pins 161 and 162 are connected directly to the chassis 2.

The cassette-mounted final positioning means 39, i.e., the two final positioning holes 37 and 38, i.e. the peripheral walls of these final positioning holes 37 and 38, is provided and constructed for the final positioning of the cassette 3 with respect to the reel drive device 52 in directions parallel to its bottom wall 8. The arrangement and construction of the cooperating final positioning means 39 and 160 is such that final positioning of the cassette 3 is possible when the cassette holder 46 is in the operating position and the reel drive device 52 is in driving engagement with the magnetic tape 26, the cassette-mounted positioning means 15 and the device-mounted positioning means 156 then being rendered inoperative, as will be described in further detail hereinafter.

As regards the reel drive device 52, which may also be referred to as magnetic tape drive means or record carrier drive means, it is to be noted that the reel drive device 52, as is apparent from FIGS. 1, 6 and 7, is disposed inside the ring-shaped gear wheel 127 in such a manner that the ring-shaped gear wheel 127 lies around the reel drive device 52 at the level of the ring-shaped gear wheel 127. This arrangement is advantageous because it results in a very compact construction, which can have a very small overall height, thus enabling the entire device 1 to have a minimal overall height.

The operation of the part of the device which is relevant in the present context will be explained hereinafter.

When the cassette 3 is inserted into the cassette holder 46, as already explained hereinbefore, the motor 104 of the drive means 103 is switched on with the aid of a photoelectric sensor. As a result of this, see FIGS. 8, 9 and 10, the retaining-means drive gear wheel 112 is driven by the gear wheel transmission 106 out of its initial position in a direction indicated by an arrow 163, as a result of which the eighth gear wheel 120 is driven in a direction indicated by an arrow 164, the ninth gear wheel 123 and the tenth gear wheel 125 are driven in a direction indicated by an arrow 165, and the ring-shaped gear wheel 127 is driven in a direction indicated by an arrow 66. As a result of this, the rod spring 115, which can be driven by the retaining-means drive gear wheel 112, is moved, which initially does not have any consequences for the actuation of the retaining means 95. Since the ring-shaped gear wheel 127 is driven, the two actuating slides 83 and 84 are moved in the first direction of movement 74 via the two drive gear racks 85 and 86. The cassette holder (see FIGS. 22 and 25) is then moved in the first direction of movement 74 with the aid of the two wire springs 142 and 143, the holder pins 71, 72 and 73 being moved in the L-shaped guide channels 79, 80 and 81 in the first direction of movement 74 and being constantly held in engagement with the cam surfaces 87, 88 and 89 with the aid of the spring means 141.

The movement of the cassette holder 46 together with the cassette 3 therein in the first direction of movement 74 is stopped in that the cassette-mounted positioning means 15 enters into operative engagement with the device-mounted positioning means 156, i.e., in that the first positioning pin 157 comes into contact with the two positioning walls 19 and 20 of the wedge-shaped recess 18, and the second positioning pin 158 comes into contact with the positioning portion 22 of the front side wall 9 of the cassette 3, as is shown in FIG. 26. A return movement of the cassette 3 in a direction opposed to the first direction of movement 74, is limited with the aid of the locking means 135. In the intermediate position shown in FIG. 26, the cassette-mounted positioning means 15 and the device-mounted positioning means 156 cooperate with one another, the holder pins 71, 72 and 73, as is shown for the holder pin 73 in FIG. 26, being spaced at a small distance from the bounding wall 167, 168 or 169 of the respective guide channel 79, 80 or 81, the bounding walls being situated before the respective holder pins 71, 72 and 73 viewed in the first direction of movement 74.

As the ring-shaped gear wheel 127 is driven further and the two actuating slides 83 and 84 are consequently moved further, the spring means 141, i.e., the two wire springs 142 and 143, are driven further in the first direction of movement 74, as a result of which, the two wire springs 142 and 143 slide with their second arms 152 and 153 onto the stops 69 and 70 of the cassette holder 46, as can be seen in FIGS. 23, 24 and 27. As a result of this, the wire springs 142 and 143 exert a force directed towards the chassis 2 on the cassette holder 46 via the stops 69 and 70, this force ensuring that the holder pins 71, 72 and 73 are permanently held in engagement with the single cam surfaces 87, 88 and 89 on the two actuating slides 83 and 84, which, due to the continued movement of the two actuating slides 83 and 84, causes the cassette holder 46 together with the cassette 3 inserted therein, to be moved in the second direction of movement 75, towards the chassis 2 and, consequently, towards the reel drive device 52. During this movement in the second direction of movement 75 the cassette-mounted positioning means 15 and the device-mounted positioning means 156 remain in operative engagement, so that, advantageously, the cassette 3 is positioned accurately from the end of the movement in the first direction of movement 74 and during the subsequent movement in the second direction of movement 75, thereby simply assuring that the drive teeth 56 of the reel drive device 52 and the drive teeth 41 of the supply reel 25 in theicassette 3 can properly mesh with each other.

Toward the end of the movement of the cassette holder 46 in the second direction of movement 75, the cassette-mounted final positioning means 39 and the device-mounted final positioning means 160 enter into operative engagement with each other, namely, in that the conical free end portions of the two final positioning pins 161 and 162 engage the final positioning holes 37 and 38 in the area of the bottom wall 8 of the cassette 3. During this engagement of the final positioning pins 161 and 162 into the final positioning holes 37 and 38, the cassette 3 is moved only a few tenths of millimeters, for example, 0.3 mm, in a direction opposite to the first direction of movement 74, as a result of which, the cassette-mounted positioning means 15 and the device-mounted positioning means 156 are rendered inoperative, which is illustrated in FIG. 27, the area between the second positioning pin 158 and the positioning portion 22 of the front wall 9 of the cassette 3 being shown as a double line. In the operating position shown in FIG. 27 of the cassette holder 46 and the cassette 3, the cassette 3 is positioned by its final positioning holes 37 and 38, and the final positioning pins 161 and 162 in that the final positioning pins 161 and 162 engage against the peripheral walls of the final positioning holes 37 and 38 with their end portions of circular cross-section. As soon as the cassette holder 46 and the cassette 3 inserted therein have reached the operating positions, the eighth gear wheel 120 and the ninth gear wheel 123 are disengaged because, see FIG. 9, the toothless portion 121 of the eighth gear wheel 120 then faces the ninth gear wheel 123. In this way, a further transmission of power from the motor 104 of the drive means 103 to the ring-shaped gear wheel 127, and, hence, to the actuating slides 83 and 84 is stopped. The extended tooth 124 of the ninth gear wheel 123, see FIG. 9, then engages against the toothless circumferential portion 121 of the eighth gear wheel 120, which precludes a backward rotation of the ninth gear wheel 123 in a direction opposite to the direction of rotation 165, and ensures that the cassette holder 45 is reliably held in its operating position.

As the retaining-means drive gear wheel 112 is further driven, the free end portion 117 of the rod spring 115 enters into driving engagement with an actuating pin 470 which projects from the retaining means 95, as is shown in FIGS. 9 and 12. As driving of the retaining-means drive gear wheel 112 continues, this causes the retaining means 95 to be pivoted in the direction indicated by the arrow 164 via the actuating pin 170, as a result of which, the retaining means 95 is pivoted from the standby position, shown in FIG. 15, into the operating position, shown in FIG. 16, the actuating pin 170 then engaging a clearance FS provided for this purpose in the mounting portion 114 of the retaining-means drive gear wheel 112, as can be seen information FIG. 10, which, in the same way as FIGS. 8 and 9, also shows the actuating pin 170. The operating position of the retaining means 95 is defined by means of positioning means, not shown, for the retaining means 95. After the retaining means 95 has reached the operating position shown in FIG. 16, in which the coupling pin 27 is coupled with the pull-out element 94 to form the pull-out assembly 102, the retaining-means drive gear wheel 112 is rotated slightly further, as a result of which, the rod spring 115, whose free end portion 117 engages against the actuating pin 170, is tensioned, thereby ensuring that the retaining means 95 is reliably held in the operating position with the aid of the rod spring 115. As soon as the retaining-means drive gear wheel 112 has reached the operating position shown in FIG. 10, the motor 104 is switched off by means, not shown, the cassette 3 and the retaining means 95 then each being in the respective operating positions.

As soon as the cassette 3 and the retaining means 95 have reached the operating positions, the pull-out assembly 102, formed by the pull-out element 94 and the coupling pin 97, can be moved to the reel hub 171 of the take-up reel 92 with the aid of the actuating means. For this purpose, the device 1 has a pull-out tape 172 having one end attached to the reel hub 171 of the take-up reel 92, and having its other end attached to the pull-out element 94, this pull-out tape, as can be seen in FIG. 1, being led to the reel hub 171 of the take-up reel 92 via a first tape guide roller arranged inside the retaining means 95, via a magnetic head 178, which is supported on actuator means 174 for an accurate tracking control, and via a second tape guide roller 176. Since the take-up reel 92 is driven in the direction of rotation 93, the pull-out assembly 102 is pulled away from the retaining means 95 with the aid of pull-out tape 172 and is guided to the reel flange 171 of the take-up reel 92 with the aid of guide means 177.

Subsequently, it is possible to record and reproduce signals, for example data signals, on the magnetic tape 26 of the cassette 3 by means of the magnetic head 175, the magnetic tape 26 then being wound onto the reel hub 171 of the take-up reel 92 or onto the reel hub of the supply reel 25.

After a recording or. reproducing process, the magnetic tape 26 can be returned into the cassette 3, in that the supply reel 25 is driven by means of the reel drive device 52. When the magnetic tape 26 has been returned completely into the cassette 3 and the coupling pin 27 has reached its correct coupling position in the cassette 3 the motor 104 can be switched on, the gear wheels of the gear wheel transmission 106 then being driven in the reverse direction of rotation, and the process described hereinbefore being effected in a reverse order, during which first the retaining means 95 is moved back from the operating position into the standby position and subsequently, the cassette holder 46 is moved back from the operating position into the loading position.

Figure 3:
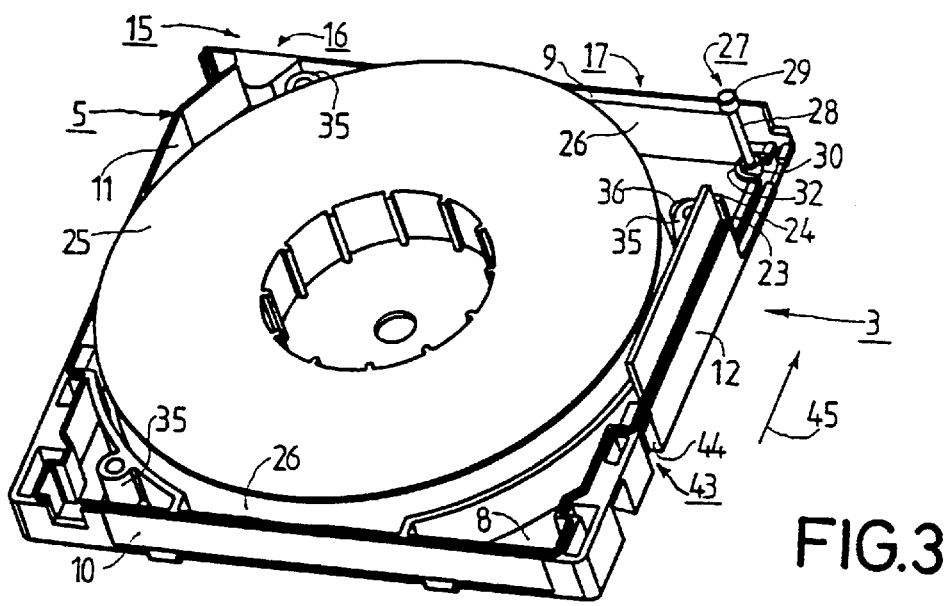
FIG. 3 is an oblique top view showing the cassette of FIG. 2 with the upper half of the housing removed.
Figure 29:
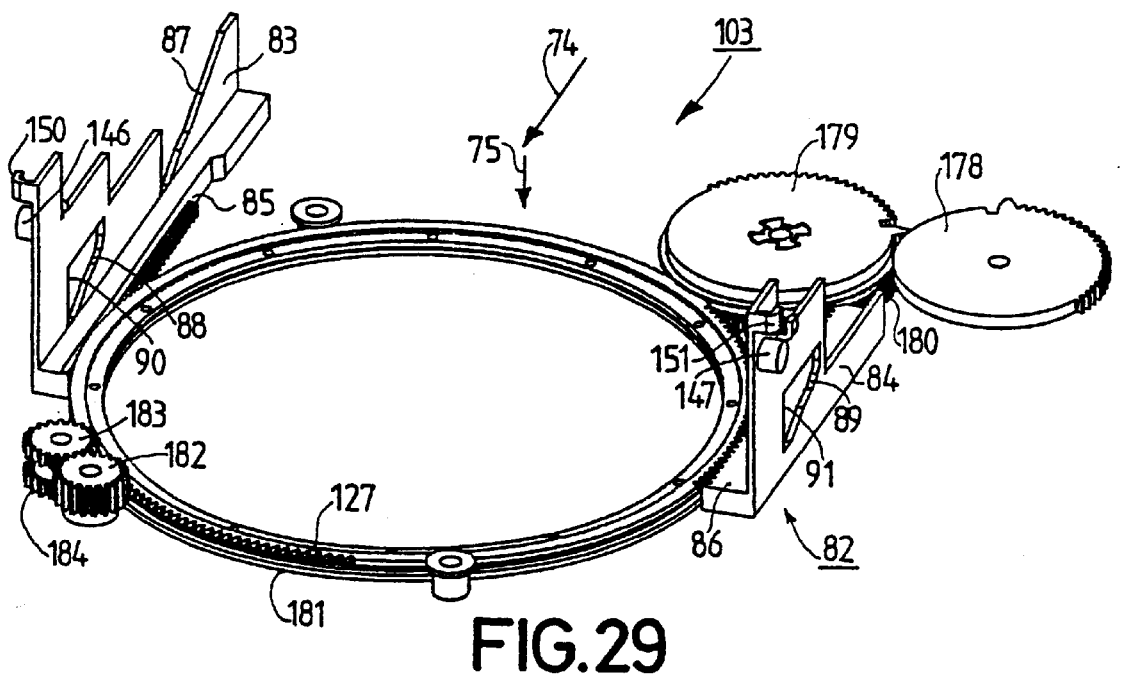
FIG. 29 shows a part of the drive means formoving the holder means of another storage device, namely, of a recording and reproducing device in accordance with another variant.

FIG. 29 shows a part of the drive means 103 of a variant of a storage device in the form of a recording and reproducing device, which differs from the drive means 103 of the device 1 as shown in FIG. 3 in that the construction is as described hereinafter.

In the drive means 103, as shown in FIG. 29 a first ring-shaped gear wheel 127, which can be driven by a motor, not shown, of the drive means 103 via some gear wheels, not shown, and via three gear wheels 178, 179 and 180, directly meshes with one drive gear rack 86, while the other drive gear rack 85 is in mesh with a second ring-shaped gear wheel 181 which is coaxial with the first ring-shaped gear wheel 127 and, in the present case, is disposed underneath the first ring-shaped gear wheel 127. The second ring-shaped gear wheel 127 is in driving engagement with the first ring-shaped gear wheel 127 via intermediate gear wheels for direction reversal. The intermediate gear wheels include a first intermediate gear wheel 182, whose teeth extend distinctly beyond the first ring-shaped gear wheel 127 in an axial direction. The first intermediate gear wheel 182 is in mesh with a second intermediate gear wheel 183 and is situated at a higher level than the first ring-shaped gear wheel 127. The second intermediate gear wheel 183 is coaxial with a third intermediate gear wheel 184 which is disposed at the same level as the second ring-shaped gear wheel 181 and which is in mesh with the second ring-shaped gear wheel 181.

Figure 30:
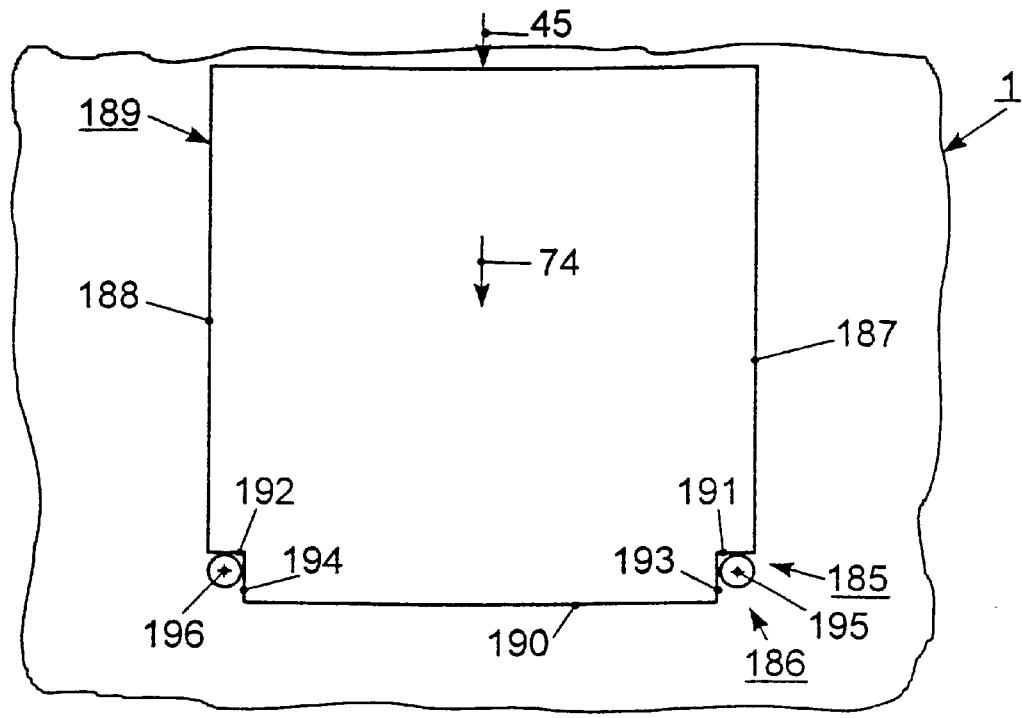
FIG. 30 shows, in a diagrammatic plan view, a storage container and positioning means for this storage container of a storage system in accordance with a second embodiment of the invention.

FIG. 30 shows, in a highly diagrammatic manner, container-mounted positioning means 185 and device-mounted positioning means 186 of a storage device 1 in accordance with a second embodiment of the invention. In the present case, the container-mounted positioning means 185 is arranged in the area of a left-hand side wall 187 and a right-hand side wall 188 of a storage container 189, and is realized by giving the storage container 189 stepped side walls 187 and 188, the container-mounted positioning means 185 being formed by the wall portions 191 and 192, which extend parallel to a front side wall 190 of the storage container 189, and by the wall portions 193 and 194, which extend from said wall portions 191 and 192 towards the front side wall 190. In the present case, the device-mounted positioning means 185 is formed by two positioning rollers 195 and 196 which are rotatably mounted in the storage device 1.

Figure 31:
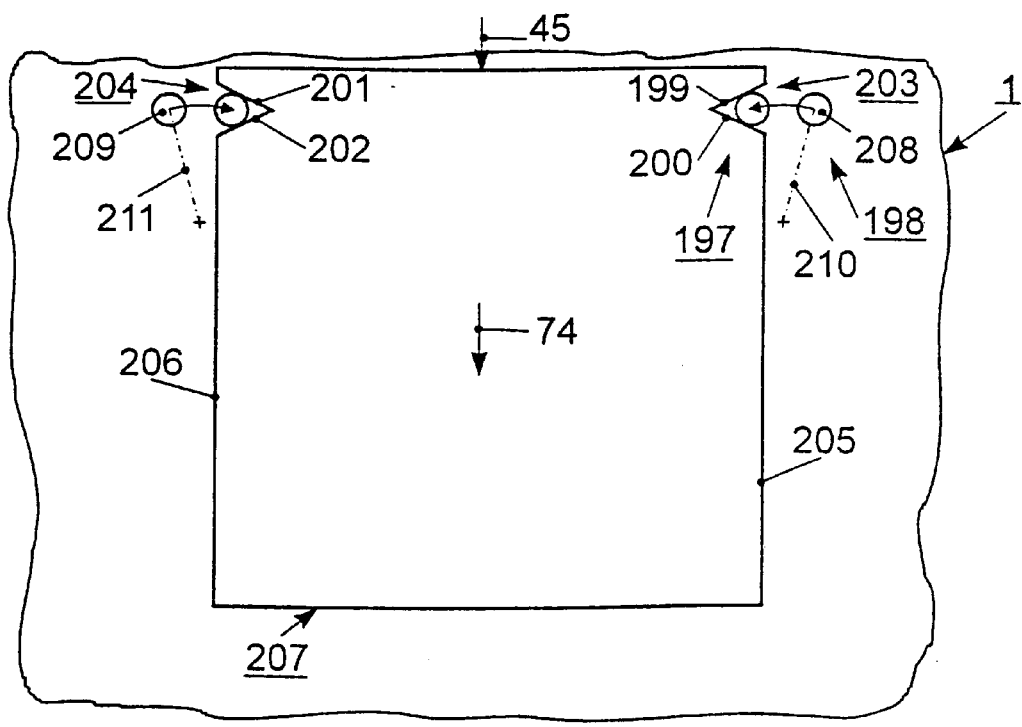
FIG. 31 shows, in a view similar to that of FIG. 30, a storage container and positioning means for this storage container of a storage system in accordance with a third embodiment of the invention.

FIG. 31 shows, in a highly diagrammatic manner, container-mounted positioning means 197 and device-mounted positioning means 198 of a storage device 1 in accordance with a third embodiment of the invention: In the present case the container-mounted positioning means 197 is formed by, each time, two bounding walls 199, 200 and 201, 202 of wedge-shaped recesses 203 and 204, respectively, the first recess 203 being formed in the area of a left-hand side wall 205 and the second recess 204 being formed in the area of a right-hand side wall 206 of a storage container 207. In this case, the device-mounted positioning means 198 is formed by two positioning pins 208 and 209, which are-mounted in the storage device 1 so as to be movable by means of diagrammatically shown levers 210 and 211, and which are movable between a rest position in which they have been swung away from the storage container 207, and a positioning position in which they have been swung towards the storage container 207.

What is claimed is:

1. A storage system comprising a storage device and a storage container loadable into the storage device the storage container having a bottom surface and containing at least one storage medium, and having access means in at least one container surface, said access means enabling access to the storage medium, wherein the storage device comprises:

movable holder means for holding a storage container;

guide means for guiding the holder means between a loading position, in which the storage container is loadable into the holder means, and an operating position, in which the storage container occupies an operating position, said guiding means guiding the holder means along an inclined guide path such that the holder means is movable out of the loading position in a first direction of movement, and into the operating position in a second direction of movement extending transversely to the first direction of movements; and storage processing means for processing the storage medium contained in the storage container, said storage processing means being in operative engagement with the storage medium via the access means of the storage container after the movement of the holder means in the second direction of movement into the operating position, characterized in that the storage container includes container-mounted positioning means, and the storage device includes device-mounted positioning means, the container-mounted positioning means and the device-mounted positioning means cooperating with each other to position the storage container with respect to the storage processing means in directions extending parallel to the bottom surface of the storage container, and the container-mounted positioning means and the device-mounted positioning means positioning the container such that, during the movement of the holder means from the loading position into the operating position, the storage container is positioned already at the end of the movement in the first direction of movement and during the subsequent movement in the second direction of movement, before the holder means has reached the operating position and before the storage processing means enters into operative engagement with the storage medium in the storage container.

2. The storage system as claimed in claim 1, characterized in that the storage system is a recording and/or reproducing system comprising a recording and/or reproducing device as the storage device, and a cassette loadable into the recording and/or reproducing device as the storage container, the cassette having a box-shaped housing with a bottom wall, an upper wall, a front side wall, a rear side wall and two further side walls, the housing containing a drivable record carrier as the storage medium, and a passage in the bottom wall as the access means for passage of record carrier drive means for the record carrier, and wherein the recording and/or reproducing device a cassette holder for holding a cassette, and wherein the storage processing means comprises record carrier drive means for driving the record carrier contained in the cassette, said record carrier drive means being operatively engaged with the record carrier via the passage of the cassette after the movement of the cassette holder into the operating position in the second direction of movement, and wherein the cassette includes cassette-mounted positioning means forming said container-mounted positioning means, and the recording and/or reproducing device includes the device-mounted positioning means, the cassette-mounted positioning means and the device-mounted positioning means cooperating with each other to position the cassette with respect to the record carrier drive means in directions extending parallel to the bottom wall, the cassette-mounted positioning means and the device-mounted positioning means positioning the cassette such that, during the movement of the cassette holder from the loading position into the operating position, the cassette is positioned already at the end of the movement in the first direction of movement and during the subsequent movement in the second direction of movement, before the cassette holder has reached operating position and before the record carrier drive means enters into driving engagement with the record carrier of the cassette.

3. The a storage system as claimed in claim 2, characterized in that the cassette-mounted positioning means is disposed in the area of at least one side wall of the housing of the cassette, said cassette-mounted positioning means being open towards the bottom wall of the cassette.

4. The storage system as claimed in claim 3, characterized in that the cassette-mounted positioning means is disposed in the area of the front side wall of the cassette, said front side wall facing forward viewed in the first direction of movement during the movement of the cassette holder in the first direction of movement.

5. The storage system as claimed in claim 4, characterized in that the cassette-mounted positioning means comprises a first positioning location and a second positioning location spaced at a given distance from the first positioning location, the first positioning location having two positioning walls projecting from the front side wall towards a cassette interior, said positioning walls being inclined towards one another and bounding a wedge-shaped recess, the wedge-shaped recess bounded by the two positioning walls opening towards the bottom wall, and the second positioning location being defined by a positioning portion of the front side wall of the cassette.

6. The storage system as claimed in claim 5, characterized in that the wedge-shaped recess, bounded by the two positioning walls, has a bounding wall extending substantially parallel to the upper wall and to the bottom wall of the cassette and is situated at a given distance from the upper wall of the cassette.

7. The storage system as claimed in claim 2, characterized in that the device-mounted positioning means comprises two positioning pins which extend transversely to the first direction of movement.

8. The storage system as claimed in claim 7, characterized in that the two positioning pins extend parallel to the second direction of movement.

9. The storage system as claimed in claim 2, characterized in that the storage further comprises locking means connected to the cassette holder for engaging and thereby locking the cassette in the cassette holder in the area of at least one locking wall extending substantially parallel to the front side wall and being spaced at a given distance from the front side wall.

10. The storage system as claimed in claim 9, characterized in that the locking means comprises at least one locking lever pivotably mounted on the cassette holder, and spring means for urging the at least one locking lever towards a locking position of the at least one locking lever.

11. The storage system as claimed in claim 10, characterized in that the locking wall comprises a bounding wall of a locking recess, said locking recess opening towards the bottom wall of the cassette.

12. The storage system as claimed in claim 2, characterized in that the cassette further comprises cassette-mounted final positioning means, and the recording and/or reproducing device further comprises device-mounted final positioning means, the cassette-mounted final positioning means and the device-mounted final positioning means for cooperating with each other for final positioning of the cassette with respect to the record carrier drive means in directions extending parallel to the bottom wall of the cassette, the cooperating cassette-mounted and device-mounted final positioning means final positioning the cassette when the cassette holder is in the operating position and the record carrier drive means is in driving engagement with the record carrier, the cassette-mounted positioning means and the device-mounted positioning means then being rendered inoperative.

13. The storage system as claimed in claim 12, characterized in that the cassette-mounted final positioning means comprises side walls of two positioning holes opening towards the bottom wall of the cassette, and the device-mounted final positioning means comprises two final positioning pins extending substantially parallel to the second direction of movement.

14. A storage device into which a storage container is loadable, the storage container having a bottom surface and containing at least one storage medium, said storage container having access means in at least one container surface, said access means enabling the storage medium to be accessed, wherein said storage device comprises:

movable holder means for holding a storage container;

guide means for guiding the holder means between a loading position, in which the storage container is loadable into the holder means, and an operating position, in which the storage container occupies an operating position, said guide means guiding said holder means along an inclined guide path such that the holder means is movable out of the loading position, in a first direction of movement, and into the operating position, in a second direction of movement extending transversely to the first direction of movement;

storage processing means for processing the storage medium contained in the storage container and being in operative engagement with the storage medium via the access means of the storage container after the holder means has been moved into the operating position, characterized in that the storage container includes container-mounted positioning means, and the storage device includes device-mounted positioning means, the container-mounted positioning means and the device-mounted positioning means cooperating with each other for positioning the storage container with respect to the storage processing means in directions parallel to the bottom surface, and the container-mounted positioning means and the device-mounted positioning means positioning the storage container such that, during the movement of the holder means from the loading position into the operating position, the storage container is positioned already at the end of the movement in the first direction of movement and during the subsequent movement in the second direction of movement, before the holder means has reached the operating position, and before the storage processing means enters into operative engagement with the storage medium in the storage container.

15. The storage device as claimed in claim 14, characterized in that the storage device is a recording and/or reproducing device into which a cassette is loadable as the storage container, said cassette comprising a box-shaped housing having a bottom wall, an upper wall, a front side wall, a rear side wall and two further side walls, said housing containing a drivable record carrier forming said storage medium, and having a passage in one of said walls forming said access means for passage of record carrier drive means for the record carrier, wherein said storage device further comprises:

a cassette holder for holding a cassette forming said movable holder means; and record carrier drive means forming the storage processing means, the record carrier drive means driving the record carrier contained in the cassette through the passage of the cassette after movement of the cassette holder into the operating position in the second direction of movement, wherein the device-mounted positioning means cooperates with cassette-mounted positioning means, forming said container-mounted positioning means, for positioning the cassette with respect to the record carrier drive means in directions extending parallel to the bottom wall, the device-mounted positioning means, in cooperation with the cassette-mounted positioning means, positioning the cassette such that, during the movement of the cassette holder from the loading position into the operating position, the cassette is positioned already at the end of the movement in the first direction of movement and during the subsequent movement in the second direction of movement, before the cassette holder has reached the operating position and before the record carrier drive means enters into driving engagement with the record carrier of the cassette.

16. The storage device as claimed in claim 15, characterized in that the device-mounted positioning means comprises two positioning pins extending transversely to the first direction of movement.

17. The storage device as claimed in claim 16, characterized in that the two positioning pins extend parallel to the second direction of movement.

18. A storage device as claimed in claim 15, characterized in that said storage device further comprises locking means connected to the cassette holder for engaging and locking the cassette present in the cassette holder in the area of at least one locking wall extending substantially parallel to the front side wall and being spaced at a given distance from the front side wall.

19. The storage device as claimed in claim 18, characterized in that the locking means comprises at least one locking lever pivotably mounted on the cassette holder, and spring means for urging the at least one locking lever towards a locking position of the at least one locking lever.

20. The storage device as claimed in claim 19, characterized in that the locking wall comprises a bounding wall of a locking recess opening towards the bottom wall of the cassette.

21. A storage device as claimed in claim 15, characterized in that the recording and/or reproducing device further comprises device-mounted final positioning means for cooperating with cassette-mounted final positioning means for final positioning of the cassette with respect to the record carrier drive means in directions extending parallel to the bottom wall of the cassette, the device-mounted final positioning means, in cooperation with the container-mounted final positioning means, final positioning the cassette when the cassette holder is in the operating position and the record carrier drive means is in driving engagement with the record carrier, the cassette-mounted positioning means and the device-mounted positioning means then being rendered inoperative.

22. The storage device as claimed in claim 21, characterized in that the device-mounted final positioning means comprises two final positioning pins extending substantially parallel to the second direction of movement.

23. A storage container having a bottom surface and containing at least one storage medium, said storage container having access means in at least one container surface for enabling access to the storage medium, being loadable into a storage device comprising movable holder means for holding a storage container, guide means for guiding the holder means between a loading position, in which the storage container is loadable into the holder means, and an operating position, in which the storage container occupies an operating position, said guiding means guiding the holder means along an inclined guide path such that the holder means is movable out of the loading position in a first direction of movement, and into the operating position in a second direction of movement extending transversely to the first direction of movement, and storage processing means for processing the storage medium contained in the storage container, said storage processing means being in operative engagement with the storage medium through the access means of the storage container after the movement of the holder means in the second direction of movement into the operating position, characterized in that the storage container comprises container-mounted positioning means for positioning the storage container with respect to the storage processing means in directions extending parallel to the bottom surface, the container-mounted positioning means positioning the storage container such that, during a movement of the holder means containing the storage container from the loading position into the operating position, the storage container is positioned already at the end of the movement in the first direction of movement and during the subsequent movement in the second direction of movement, the cassette-mounted positioning means cooperating with device-mounted positioning means to effect said positioning before the storage processing means enters into operative engagement with the storage medium in the storage container.

24. The storage container as claimed in claim 23, characterized in that the storage container is a cassette comprising a box-shaped housing having a bottom wall, an upper wall, a front side wall, a rear side wall and two further side walls, said cassette containing a drivable record carrier forming the storage medium in the housing, and having a passage in one of said walls forming the access means for allowing passage of record carrier drive means for the record carrier, said cassette being into a recording and/or reproducing device a cassette holder forming the movable holder means for holding a cassette, said guide means guiding the cassette holder between a loading position, in which the cassette is loadable into the cassette holder, and an operating position, in which the cassette occupies an operating position, the guiding means guiding the cassette holder along an inclined guide path such that the cassette holder is movable out of the loading position in a first direction of movement and into operating position in a second direction of movement extending transversely to the first direction of movement, and record carrier drive means forming the storage processing means for driving the record carrier contained in the cassette, said record carrier drive means being in driving engagement with the record carrier through the passage of the cassette after the movement of the cassette holder into the operating position in the second direction of movement, wherein the cassette further comprises cassette-mounted positioning means forming the container-mounted positioning means for positioning the cassette with respect to the record carrier drive means in directions extending parallel to bottom wall, and the cassette-mounted positioning means positioning the cassette such that, during a movement of the device-mounted cassette holder which contains the cassette from the loading position into the operating position, the cassette is positioned already at the end of the movement in the first direction of movement and during the subsequent movement in the second direction of movement, the cassette-mounted positioning means cooperating with the device-mounted positioning means for effecting said positioning before the record carrier drive means enters into driving engagement with the record carrier of the cassette.

25. The storage container as claimed in claim 24, characterized in that the cassette-mounted positioning means is disposed in the area of at least one of said side walls of the housing of the cassette and is open towards the bottom wall of the cassette.

26. The storage container as claimed in claim 25, characterized in that the cassette-mounted positioning means is disposed in the area of the front side wall of the cassette.

27. The storage container as claimed in claim 26, characterized in that the cassette-mounted positioning means comprises a first positioning location and a second positioning location spaced at a given distance from the first positioning location the first positioning location having two positioning walls projecting from the front side wall towards a cassette interior, said two positioning walls being inclined towards one another and bounding a wedge-shaped recess, the wedge-shaped recess bounded by the two positioning walls being open towards the bottom wall, and the second positioning location being defined by a positioning portion of the front side wall of the cassette.

28. A storage container as claimed in claim 27, characterized in that the wedge-shaped recess bounded by the two positioning walls has a bounding wall extending substantially parallel to the upper wall and to the bottom wall of the cassettes, and is situated at a given distance from the upper wall of the cassette.

29. The storage container as claimed in claim 24, characterized in that the cassette further comprises cassette-mounted final positioning means for cooperating with device-mounted final positioning means and for final positioning the cassette with respect to the record carrier drive means in directions extending parallel to the bottom wall of the cassette, positioning of the cassette the cassette-mounted final positioning means cooperating with device-mounted final positioning means for final position said cassette when the record carrier drive means is in driving engagement with the record carrier of the cassette, the cassette-mounted positioning means and the device-mounted positioning means then being rendered inoperative.

30. The storage container as claimed in claim 29, characterized in that the cassette-mounted final positioning means comprises side walls of two positioning holes opening towards the bottom wall of the cassette.

* * * * *